United States Patent
Duluk, Jr. et al.

(10) Patent No.: US 6,525,737 B1
(45) Date of Patent: Feb. 25, 2003

(54) GRAPHICS PROCESSOR WITH PIPELINE STATE STORAGE AND RETRIEVAL

(75) Inventors: Jerome F. Duluk, Jr., Palo Alto, CA (US); Jack Benkual, Cupertino, CA (US); Shun Wai Go, Milpitas, CA (US); Sushma S. Trivedi, Sunnyvale, CA (US); Richard E. Hessel, Pleasanton, CA (US); Joseph P. Bratt, San Jose, CA (US)

(73) Assignee: Apple Computer, Inc., Cupertino, CA (US)

(*) Notice: Subject to any disclaimer, the term of this patent is extended or adjusted under 35 U.S.C. 154(b) by 0 days.

(21) Appl. No.: 09/378,439

(22) Filed: Aug. 20, 1999

Related U.S. Application Data

(60) Provisional application No. 60/097,336, filed on Aug. 20, 1998.

(51) Int. Cl.$^7$ .................................................. G06T 1/20
(52) U.S. Cl. ........................ 345/506; 345/502; 345/505
(58) Field of Search ................................ 345/506, 505, 345/504, 502, 503, 419

(56) References Cited

U.S. PATENT DOCUMENTS

| | | | |
|---|---|---|---|
| 4,783,829 A | * 11/1988 | Miyakawa et al. | 382/199 |
| 4,945,500 A |   7/1990 | Deering | 364/522 |
| 4,970,636 A |  11/1990 | Snodgrass et al. | 364/518 |
| 5,083,287 A |   1/1992 | Obata et al. | 395/126 |
| 5,123,085 A |   6/1992 | Wells et al. | |
| 5,402,532 A |   3/1995 | Epstein et al. | 395/122 |
| 5,448,690 A | *  9/1995 | Shiraishi et al. | 395/133 |
| 5,455,900 A | * 10/1995 | Shiraishi et al. | 395/141 |
| 5,481,669 A |   1/1996 | Poulton et al. | |
| 5,574,836 A |  11/1996 | Broemmelsiek | 395/127 |
| 5,579,455 A |  11/1996 | Greene et al. | |
| 5,596,686 A |   1/1997 | Dulukm, Jr. | |

(List continued on next page.)

OTHER PUBLICATIONS

Angel (interactive computer graphics: a top–down approach with OpenG1: ISBN: 0–201–85571–2—sections 6.8 & 7.7.2).

Schilling et al., "Texram: a smart memory for texturing," IEEE computer graphics and applications, 5/96, 32–41.

Watt, "3D Computer Graphics" (2nd ed.), Chapter 4, Reflection and Illumination Models, p. 89–126.

Foley et al., Computer Graphics—Principles and Practice (2nd ed. 1996), Chapter 16, Illumination and Shading, pp. 721–814.

Lathrop, "The Way Computer Graphics Works" (1997) Chapter 7, Rendering (Converting A Scene to Pixels), pp. 93–150.

Peercy et al., "Efficient Bump Mapping Hardware" (Computer Graphics Proceedings, Annual Conference Series, 1997) pp. 303–306.

(List continued on next page.)

Primary Examiner—Mark Zimmerman
Assistant Examiner—Mackly Monestime
(74) Attorney, Agent, or Firm—Dorsey & Whitney LLP

(57) ABSTRACT

A deferred graphics pipeline processor comprised of a mode extraction unit and a Polygon Memory associated with the polygon unit. The mode extraction unit receives a data stream from a geometry unit and separates the data stream into vertices data, and non-vertices data which is sent to the Polygon Memory for storage. A mode injection unit receives inputs from the Polygon Memory and communicates the mode information to one or more other processing units. The mode injection unit maintains status information identifying the information that is already cached and not sending information that is already cached, thereby reducing communication bandwidth.

22 Claims, 21 Drawing Sheets

U.S. PATENT DOCUMENTS

| | | | |
|---|---|---|---|
| 5,664,071 A * | 9/1997 | Nagashima | 395/103 |
| 5,684,939 A | 11/1997 | Foran et al. | 395/131 |
| 5,699,497 A | 12/1997 | Erdahl et al. | |
| 5,710,876 A | 1/1998 | Peercy et al. | 395/126 |
| 5,767,589 A | 6/1998 | Lake et al. | |
| 5,767,859 A | 6/1998 | Rossin et al. | 345/434 |
| 5,798,770 A * | 8/1998 | Baldwin | 345/506 |
| 5,828,378 A | 10/1998 | Shiraishi | 345/422 |
| 5,841,447 A | 11/1998 | Drews | |
| 5,850,225 A * | 12/1998 | Cosman | 345/427 |
| 5,854,631 A | 12/1998 | Akeley et al. | 345/419 |
| 5,860,158 A * | 1/1999 | Pai et al. | 711/118 |
| 5,864,342 A | 1/1999 | Kajiya et al. | 345/418 |
| RE36,145 E | 3/1999 | DeAguiar et al. | 345/511 |
| 5,880,736 A | 3/1999 | Peercy et al. | 345/426 |
| 5,889,997 A | 3/1999 | Strunk | |
| 5,920,326 A | 7/1999 | Rentschler et al. | 345/503 |
| 5,949,424 A | 9/1999 | Cabral et al. | 345/426 |
| 5,949,428 A | 9/1999 | Toelle et al. | |
| 5,977,977 A | 11/1999 | Kajiya et al. | 345/418 |
| 5,990,904 A | 11/1999 | Griffin | |
| 6,002,412 A | 12/1999 | Schinnerer | |
| 6,118,452 A | 9/2000 | Gannett | |
| 6,128,000 A | 10/2000 | Jouppi et al. | |
| 6,204,859 B1 | 3/2001 | Jouppi et al. | |
| 6,229,553 B1 * | 5/2001 | Duluk, Jr. et al. | 345/506 |
| 6,246,415 B1 | 6/2001 | Grossman et al. | |
| 6,259,452 B1 | 7/2001 | Coorg et al. | |

\* cited by examiner

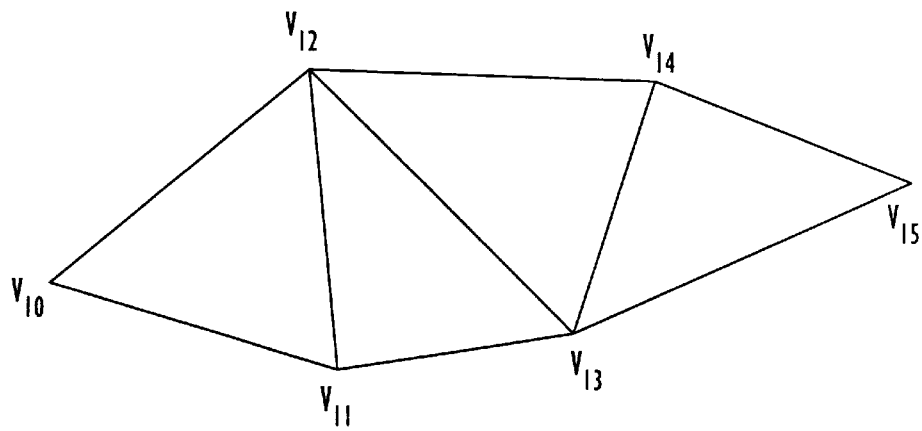

FIG. 11A

| VERTEX INFORMATION V1 | SORT PRIMITIVE TYPE | STATE INFORMATION S2a | COLORADDRESS | COLOROFFSET | COLORTYPE | COLORSIZE |
|---|---|---|---|---|---|---|
| $V_{10}$ V1 FOR $V_{10}$ | tri_strip | S2a | 0x00103D | 0x00 | tri_strip | 0x02 |
| $V_{11}$ V1 FOR $V_{11}$ | tri_strip | S2a | 0x00103F | 0x01 | tri_strip | 0x02 |
| $V_{12}$ V1 FOR $V_{12}$ | tri_strip | S2a | 0x001041 | 0x02 | tri_strip | 0x02 |
| $V_{13}$ V1 FOR $V_{13}$ | tri_strip | S2a | 0x001043 | 0x03 | tri_strip | 0x02 |
| $V_{14}$ V1 FOR $V_{14}$ | tri_strip | S2a | 0x001045 | 0x04 | tri_strip | 0x02 |
| $V_{15}$ V1 FOR $V_{15}$ | tri_strip | S2a | 0x001047 | 0x05 | tri_strip | 0x02 |

SIX VERTEX ENTRIES IN SORT MEMORY

COLOR POINTERS

FIG. 11B

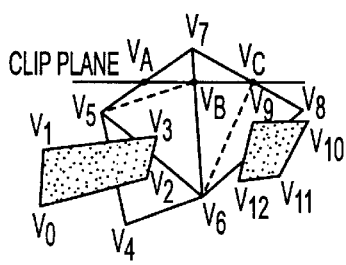

FIG. 14A

| PACKET NUMBER | PACKET TYPE | VERTEX NUMBER | REUSE | TYPE | FrontFace | COMPLETED PRIMITVE FOR SRT | COMPLETED PRIMITVE FOR MEX |
|---|---|---|---|---|---|---|---|
| 1 | BeginFrame | | | | | | |
| 2 | CullMode | | | | | | |
| 3 | MatFront | | | | | | |
| 4 | MatBack | | | | | | |
| 5 | TexAFront | | | | | | |
| 6 | TexABack | | | | | | |
| 7 | TexBFront | | | | | | |
| 8 | TexBBack | | | | | | |
| 9 | PixMode | | | | | | |
| 10 | LIGHT | | | | | | |
| 11 | STIPPLE | | | | | | |
| 12 | VtxMode | | | | | | |
| 13 | CLEAR | | | | | | |
| 14 | MatFront | | | | | | |
| 15 | TexAFront | | | | | | |
| 16 | COLOR | $V_0$ | M | N | 1 | | |
| 17 | SORT | $V_0$ | M | N | 1 | | |
| 18 | COLOR | $V_1$ | M | N | 1 | | |
| 19 | SORT | $V_1$ | M | N | 1 | | |
| 20 | COLOR | $V_2$ | M | T | 1 | | |
| 21 | SORT | $V_2$ | M | T | 1 | $V_2$-$V_1$-$V_0$ | $V_2$-$V_1$-$V_0$ |
| 22 | COLOR | $V_3$ | M | T | 1 | | $V_3$-$V_2$-$V_1$ |
| 23 | SORT | $V_3$ | M | T | 1 | $V_3$-$V_2$-$V_1$ | |
| 24 | MatFront | | | | | | |
| 25 | TexAFront | | | | | | |
| 26 | COLOR | $V_4$ | M | N | 1 | | |
| 27 | SORT | $V_4$ | M | N | 1 | | |
| 28 | COLOR | $V_5$ | M | N | 1 | | |
| 29 | SORT | $V_5$ | M | N | 1 | | |
| 30 | COLOR | $V_6$ | M | T | 1 | | $V_6$-$V_5$-$V_4$ |
| 31 | SORT | $V_6$ | M | T | 1 | $V_6$-$V_5$-$V_4$ | $V_7$-$V_6$-$V_5$ |
| 32 | COLOR | $V_7$ | M | T | 1 | | |
| 33 | SORT | $V_7$ | M | N | 1 | | |
| 34 | SORT | $V_A$ | M | N | 1 | | |
| 35 | SORT | $V_B$ | M | T | 1 | $V_B$-$V_A$-$V_5$ | |
| 36 | SORT | $V_6$ | O | T | 1 | $V_6$-$V_B$-$V_5$ | |
| 37 | COLOR | $V_8$ | M | T | 1 | | $V_8$-$V_7$-$V_6$ |
| 38 | SORT | $V_6$ | M | N | 1 | | |
| 39 | SORT | $V_B$ | M | N | 1 | | |
| 40 | SORT | $V_C$ | M | T | 1 | $V_C$-$V_B$-$V_6$ | |
| 41 | SORT | $V_8$ | O | T | 1 | $V_8$-$V_C$-$V_6$ | |
| 42 | CullMode | | | | | | |
| 43 | MatFront | | | | | | |
| 44 | TexAFront | | | | | | |
| 45 | LIGHT | | | | | | |
| 46 | VtxMode | | | | | | |
| 47 | COLOR | $V_9$ | M | N | 0 | | |
| 48 | SORT | $V_9$ | M | N | 0 | | |
| 49 | COLOR | $V_{10}$ | M | N | 0 | | |
| 50 | SORT | $V_{10}$ | M | N | 0 | | |
| 51 | COLOR | $V_{11}$ | M | T | 0 | | $V_{11}$-$V_{10}$-$V_9$ |
| 52 | SORT | $V_{11}$ | M | T | 0 | $V_{11}$-$V_{10}$-$V_9$ | $V_{12}$-$V_{11}$-$V_9$ |
| 53 | COLOR | $V_{12}$ | O | T | 0 | | |
| 54 | SORT | $V_{12}$ | O | T | 0 | $V_{12}$-$V_{11}$-$V_9$ | |
| 55 | EndFrame | | | | | | |

FIG. 14B

| ADDRESS IN SORT MEMORY | VERTEX INFORMATION VI | SORT PRIMITIVE TYPE | STATE INFORMATION S2a | COLORADDRESS | COLOROFFSET | COLORTYPE | COLORSIZE |
|---|---|---|---|---|---|---|---|
| 0x0000000 | CullMode pkt 2 ||||||||
| 0x0000010 | Clear pkt 13, ColorAddress = 0xFFFFFF FOR PixMode DATA ONLY |||||||
| 0x0000020 | V1 FOR $V_0$ | DON'T CARE | pkt 12 | DON'T CARE | DON'T CARE | DON'T CARE | 0x02 |
| 0x0000030 | V1 FOR $V_1$ | DON'T CARE | pkt 12 | DON'T CARE | DON'T CARE | DON'T CARE | 0x02 |
| 0x0000040 | V1 FOR $V_2$ | tri_strip | pkt 12 | 0x000005 | 0x02 | tri_strip | 0x02 |
| 0x0000050 | V1 FOR $V_3$ | tri_strip | pkt 12 | 0x000007 | 0x03 | tri_strip | 0x02 |
| 0x0000060 | V1 FOR $V_4$ | DON'T CARE | pkt 12 | 0x00000A | DON'T CARE | DON'T CARE | 0x01 |
| 0x0000070 | V1 FOR $V_5$ | DON'T CARE | pkt 12 | 0X00000B | DON'T CARE | DON'T CARE | 0x01 |
| 0x0000080 | V1 FOR $V_6$ | tri_strip | pkt 12 | 0X00000C | 0x02 | tri_strip | 0x01 |
| 0x0000090 | V1 FOR $V_5$ | DON'T CARE | pkt 12 | DON'T CARE | DON'T CARE | DON'T CARE | 0x01 |
| 0x00000A0 | V1 FOR $V_A$ | DON'T CARE | pkt 12 | DON'T CARE | DON'T CARE | DON'T CARE | 0x01 |
| 0x00000B0 | V1 FOR $V_B$ | tri_fan | pkt 12 | 0x00000D | 0x03 | tri_strip | 0x01 |
| 0x00000C0 | V1 FOR $V_6$ | tri_fan | pkt 12 | 0x00000D | 0x03 | tri_strip | 0x01 |
| 0x00000D0 | V1 FOR $V_6$ | DON'T CARE | pkt 12 | DON'T CARE | DON'T CARE | DON'T CARE | 0x01 |
| 0x00000E0 | V1 FOR $V_B$ | DON'T CARE | pkt 12 | DON'T CARE | DON'T CARE | DON'T CARE | 0x01 |
| 0x00000F0 | V1 FOR $V_C$ | tri_fan | pkt 12 | 0x00000E | 0x04 | tri_strip | 0x01 |
| 0x0000100 | V1 FOR $V_8$ | tri_fan | pkt 12 | 0x00000E | 0x04 | tri_strip | 0x01 |
| 0x0000110 | CullMode pkt 42 |||||||
| 0x0000120 | V1 FOR $V_9$ | DON'T CARE | pkt 46 | DON'T CARE | DON'T CARE | DON'T CARE | 0x02 |
| 0x0000130 | V1 FOR $V_{10}$ | DON'T CARE | pkt 46 | DON'T CARE | DON'T CARE | DON'T CARE | 0x02 |
| 0x0000140 | V1 FOR $V_{11}$ | tri_fan | pkt 46 | 0x000014 | 0x02 | tri_fan | 0x02 |
| 0x0000150 | V1 FOR $V_{12}$ | tri_fan | pkt 46 | 0x000016 | 0x03 | tri_fan | 0x02 |

FIG. 15

| ADDRESS IN POLYGON MEMORY | | | | | | | |
|---|---|---|---|---|---|---|---|
| 0x0000000 | 0xFFFFFD | 0xFFFFFC | 0xFFFFFB | 0xFFFFF5 | 0xFFFFFF | 0xFFFFF0 | MLM POINTERS FOR TRIANGLE STRIP $V_0$ TO $V_3$ |
| 0x0000010 0x0000020 | VERTEX INFORMATION V2 FOR VERTEX $V_0$ pkt 16 | | | | | | |
| 0x0000030 0x0000040 | VERTEX INFORMATION V2 FOR VERTEX $V_1$ pkt 18 | | | | | | |
| 0x0000050 0x0000060 | VERTEX INFORMATION V2 FOR VERTEX $V_2$ pkt 20 | | | | | | |
| 0x0000070 0x0000080 | VERTEX INFORMATION V2 FOR VERTEX $V_3$ pkt 22 | | | | | | |
| 0x0000090 | 0xFFFFEE | 0xFFFFED | 0xFFFFFB | 0xFFFFF5 | 0xFFFFFF | 0xFFFFF0 | MLM POINTERS FOR TRIANGLE STRIP $V_4$ TO $V_8$ |
| 0x00000A0 | VERTEX INFORMATION V2 FOR VERTEX $V_4$ pkt 26 | | | | | | |
| 0x00000B0 | VERTEX INFORMATION V2 FOR VERTEX $V_5$ pkt 28 | | | | | | |
| 0x00000C0 | VERTEX INFORMATION V2 FOR VERTEX $V_6$ pkt 30 | | | | | | |
| 0x00000D0 | VERTEX INFORMATION V2 FOR VERTEX $V_7$ pkt 32 | | | | | | |
| 0x00000E0 | VERTEX INFORMATION V2 FOR VERTEX $V_8$ pkt 37 | | | | | | |
| 0x00000F0 | 0xFFFFEB | 0xFFFFEA | 0xFFFFF9 | 0xFFFFE3 | 0xFFFFFF | 0xFFFFF0 | MLM POINTERS FOR TRIANGLE STRIP $V_9$ TO $V_{12}$ |
| 0x0000100 0x0000110 | VERTEX INFORMATION V2 FOR VERTEX $V_9$ pkt 47 | | | | | | |
| 0x0000120 0x0000130 | VERTEX INFORMATION V2 FOR VERTEX $V_{10}$ pkt 49 | | | | | | |
| 0x0000140 0x0000150 | VERTEX INFORMATION V2 FOR VERTEX $V_{11}$ pkt 51 | | | | | | |
| 0x0000160 0x0000170 | VERTEX INFORMATION V2 FOR VERTEX $V_{12}$ pkt 53 | | | | | | |
| ⋮ | ↓ FILLING OF VERTEX INFORMATION V2 ⋮ ↑ FILLING STATE INFORMATION S3 | | | | | | |
| 0xFFFFE30 0xFFFFE40 0xFFFFE50 0xFFFFE60 0xFFFFE70 0xFFFFE80 | LIGHT pkt 45 | | | | | | |

FIG. 16A

| Address | Content |
|---|---|
| 0xFFFFE90 | TexBBack pkt 8 |
| 0xFFFFEA0 | TexABack pkt 6 |
| 0xFFFFEB0 | MatBack pkt 4 |
| 0xFFFFEC0 | |
| 0xFFFFED0 | TexAFront pkt 25 |
| 0xFFFFEE0 | MatFront pkt 24 |
| 0xFFFFEF0 | |
| 0xFFFFF00 | STIPPLE pkt 11 |
| 0xFFFFF10 | |
| 0xFFFFF20 | |
| 0xFFFFF30 | |
| 0xFFFFF40 | |
| 0xFFFFF50 | LIGHT pkt 10 |
| 0xFFFFF60 | |
| 0xFFFFF70 | |
| 0xFFFFF80 | |
| 0xFFFFF90 | |
| 0xFFFFFA0 | |
| 0xFFFFFB0 | TexBFront pkt 7 |
| 0xFFFFFC0 | TexAFront pkt 15 |
| 0xFFFFFD0 | MatFront pkt 14 |
| 0xFFFFFE0 | |
| 0xFFFFFF0 | PixMode pkt 9 |

FIG. 16B

GRAPHICS PROCESSOR WITH PIPELINE STATE STORAGE AND RETRIEVAL

RELATED APPLICATIONS

This application claims the benefit of U.S. Provisional Patent Application Ser. No. 60/097,336 entitled Graphics Processor with Deferred Shading filed Aug. 20, 1998, incorporated by reference.

Ser. No. 09/213,990, filed Dec. 17, 1998, entitled HOW TO DO TANGENT SPACE LIGHTING IN A DEFERRED SHADING ARCHITECTURE;

Ser. No. 09/378,598, filed Aug. 20, 1999, entitled APPARATUS AND METHOD FOR PERFORMING SETUP OPERATIONS IN A 3-D GRAPHICS PIPELINE USING UNIFIED PRIMITIVE DESCRIPTORS;

Ser. No. 09/378,633, filed Aug. 20, 1999, entitled SYSTEM, APPARATUS AND METHOD FOR SPATIALLY SORTING IMAGE DATA IN A THREE-DIMENSIONAL GRAPHICS PIPELINE;

Ser. No. 09/378,408, filed Aug. 20, 1999, entitled METHOD AND APPARATUS FOR GENERATING TEXTURE;

Ser. No. 09/379,144, filed Aug. 20, 1999, entitled APPARATUS AND METHOD FOR GEOMETRY OPERATIONS IN A 3D GRAPHICS PIPELINE;

Ser. No. 09/372,137, filed Aug. 20, 1999, entitled APPARATUS AND METHOD FOR FRAGMENT OPERATIONS IN A 3D GRAPHICS PIPELINE;

Ser. No. 09/378,687 filed Aug. 20, 1999, entitled DEFERRED SHADING GRAPHICS PIPELINE PROCESSOR;

Ser. No. 09/377,503, filed Aug. 20, 1999, entitled DEFERRED SHADING GRAPHICS PIPELINE PROCESSOR HAVING ADVANCED FEATURES;

Ser. No. 09/378,391, filed Aug. 20, 1999, entitled METHOD AND APPARATUS FOR PERFORMING CONSERVATIVE HIDDEN SURFACE REMOVAL IN A GRAPHICS PROCESSOR WITH DEFERRED SHADING; and Ser. No. 09/378,299, filed Aug. 20, 1999, entitled DEFERRED SHADING GRAPHICS PIPELINE PROCESSOR, now U.S. Pat. No. 6,229,553.

FIELD OF THE INVENTION

This invention generally relates to computing systems, more particularly to three-dimensional computer graphics, and most particularly to structure and method for a pipelined three-dimensional graphics processor implementing the saving and retrieving of graphics pipeline state information.

BACKGROUND

Computer graphics is the art and science of generating pictures with a computer. Generation of pictures, or images, is commonly called rendering. Generally, in three-dimensional (3D) computer graphics, geometry that represents surfaces (or volumes) of objects in a scene is translated into pixels stored in a frame buffer, and then displayed on a display device. Real-time display devices, such as CRTs used as computer monitors, refresh the display by continuously displaying the image over and over.

In a 3D animation, a sequence of images is displayed, giving the illusion of motion in three-dimensional space. Interactive 3D computer graphics allows a user to change his viewpoint or change the geometry in real-time, thereby requiring the rendering system to create new images on-the-fly in real-time.

In 3D computer graphics, each renderable object generally has its own local object coordinate system, and therefore needs to be translated (or transformed) from object coordinates to pixel display coordinates, and this is shown diagrammatically in FIG. 1. Conceptually, this is a 4-step process: 1) transformation (including scaling for size enlargement or shrink) from object coordinates to world coordinates, which is the coordinate system for the entire scene; 2) transformation from world coordinates to eye coordinates, based on the viewing point of the scene; 3) transformation from eye coordinates to perspective translated coordinates, where perspective scaling (farther objects appear smaller) has been performed; and 4) transformation from perspective translated coordinates to pixel coordinates. These transformation steps can be compressed into one or two steps by precomputing appropriate transformation matrices before any transformation occurs. Once the geometry is in screen coordinates, it is broken into a set of pixel color values (that is "rasterized") that are stored into the frame buffer.

Many techniques are used for generating pixel color values, including Gouraud shading, Phong shading, and texture mapping. After color values are determined, pixels are stored or displayed. In the absence of z-buffering or alpha blending, the last pixel color written to a position is the visible pixel. This means that the order in which rendering takes place affects the final image. Z-buffering causes the last pixel to be written only if it is spatially "in front" of all other pixels in a position. This is one form of hidden surface removal.

For a typical computer system, the display screen refers to a window within the computer's display (composed of one or more CRTs). But, for typical game applications, the display screen is typically the entire display.

A summary of the prior art rendering process can be found in: "Fundamentals of Three-dimensional Computer Graphics", by Watt, Chapter 5: The Rendering Process, pages 97 to 113, published by Addison-Wesley Publishing Company, Reading, Mass. 1989, reprinted 1991, ISBN 0-201-15442-0.

Many hardware renderers have been developed, and an example is incorporated herein by reference: "Leo: A System for Cost Effective 3D Shaded Graphics", by Deering and Nelson, pages 101 to 108 of SIGGRAPH93 Proceedings, Aug. 1–6, 1993, Computer Graphics Proceedings, Annual Conference Series, published by ACM SIGGRAPH, New York, 1993, Softcover ISBN 0-201-58889-7 and CD-ROM ISBN 0-201-56997-3 (hereinafter referred to as the Deering Reference). The Deering Reference includes a diagram of a generic 3D graphics pipeline (i.e., a renderer, or a rendering system) that it describes as "truly generic, as at the top level nearly every commercial 3D graphics accelerator fits this abstraction", and this pipeline diagram is reproduced here as FIG. 2. Such pipeline diagrams convey the process of rendering, but do not describe any particular hardware. Prior art pipelined architectures render according to the order objects are received. This limits them from producing some images efficiently.

BRIEF DESCRIPTION OF THE DRAWINGS

FIG. 11, is a diagrammatic illustration showing an exemplary triangle mesh of four triangles and the corresponding six entries in Sort Memory.

FIG. 14 is a diagrammatic illustration showing example packets sent to an exemplary MEX block, including node data associated with clipped polygons.

FIG. 15 is a diagrammatic illustration showing example entries in Sort Memory corresponding to the example packets shown in FIG. 14.

FIG. 16 is a diagrammatic illustration showing example entries in Polygon Memory corresponding to the example packets shown in FIG. 14.

DETAILED DESCRIPTION

Provisional U.S. patent application Ser. No. 60/097,336, hereby incorporated by reference, assigned to Raycer, Inc. pertains to a novel graphics processor. In that patent application, it is described that pipeline state data (also called "mode" data) is extracted and later injected, in order to provide a highly efficient pipeline process and architecture. That patent application describes a novel graphics processor in which hidden surfaces may be removed prior to the rasterization process, thereby allowing significantly increased performance in that computationally expensive per-pixel calculations are not performed on pixels which have already been determined to not affect the final rendered image.

System Overview

In a traditional graphics pipeline, the state changes are incremental; that is, the value of a state parameter remains in effect until it is changed, and changes simply overwrite the older value because they are no longer needed. Furthermore, the rendering is linear; that is, primitives are completely rendered (including rasterization down to final pixel colors) in the order received, utilizing the pipeline state in effect at the time each primitive is received. Points, lines, triangles, and quadrilaterals are examples of graphical primitives. Primitives can be input into a graphics pipeline as individual points, independent lines, independent triangles, triangle strips, triangle fans, polygons, quads, independent quads, or quad strips, to name the most common examples. Thus, state changes are accumulated until the spatial information for a primitive (i.e., the completing vertex) is received, and those accumulated states are in effect during the rendering of that primitive.

Figure 1:
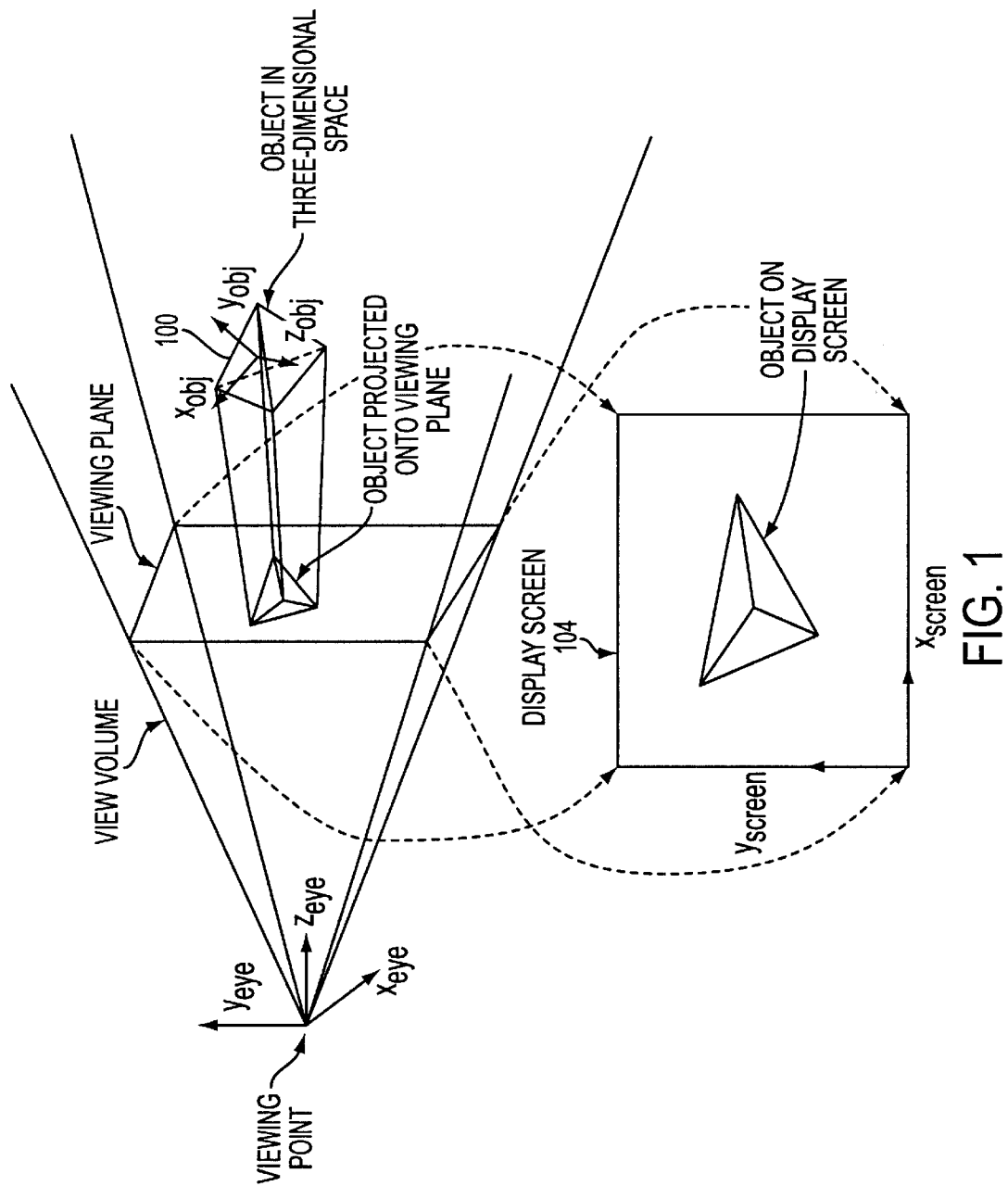
FIG. 1 is a diagrammatic illustration showing a tetrahedron, with its own coordinate axes, a viewing point's coordinate system, and screen coordinates.
Figure 2:
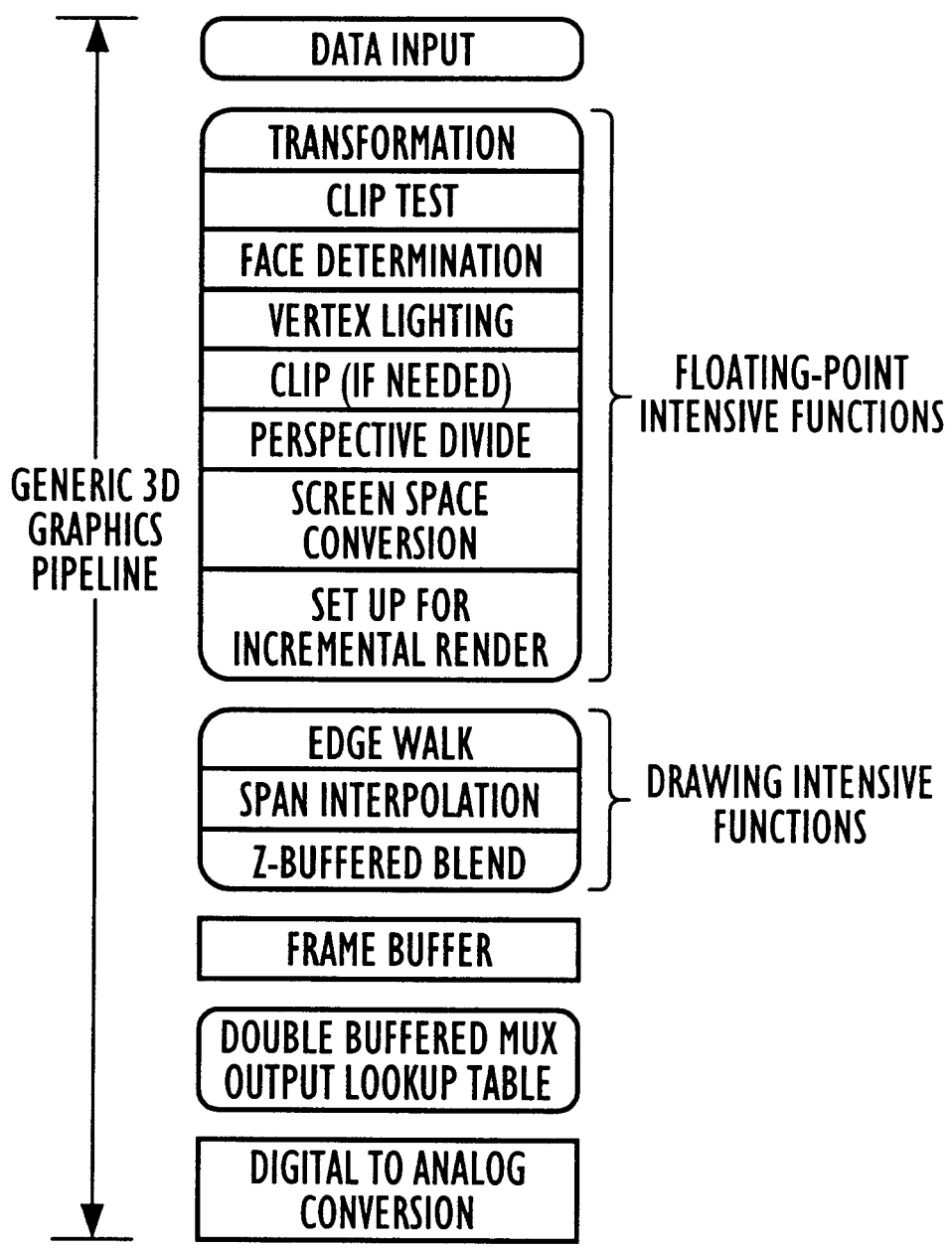
FIG. 2 is a diagrammatic illustration showing the processing path in a typical prior art 3D rendering pipeline.
Figure 3:
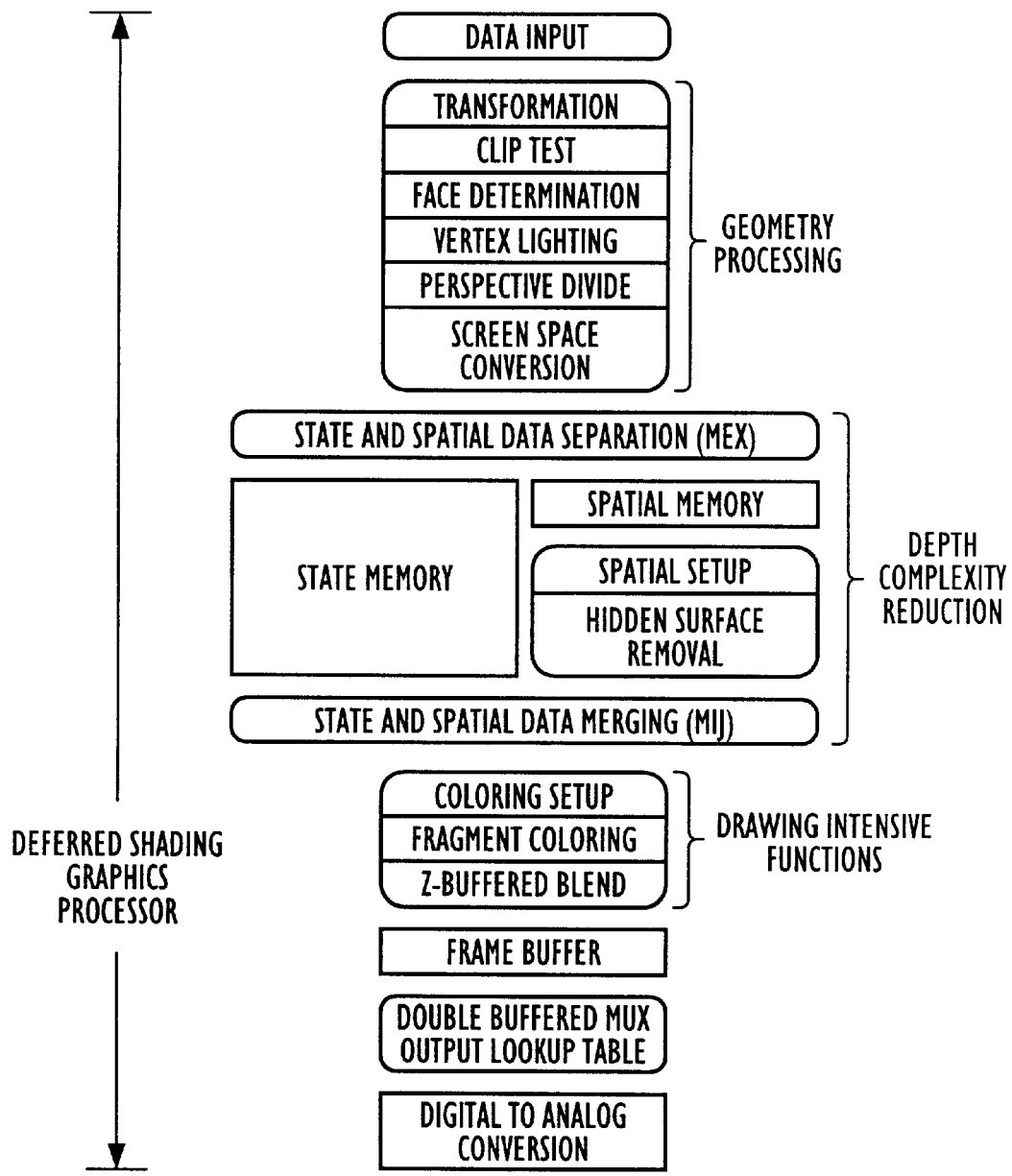
FIG. 3 is a diagrammatic illustration showing the processing path in one embodiment of the inventive 3D Deferred Shading Graphics Pipeline, with a MEX step that splits the data path into two parallel paths and a MIJ step that merges the parallel paths back into one path.
Figure 4:
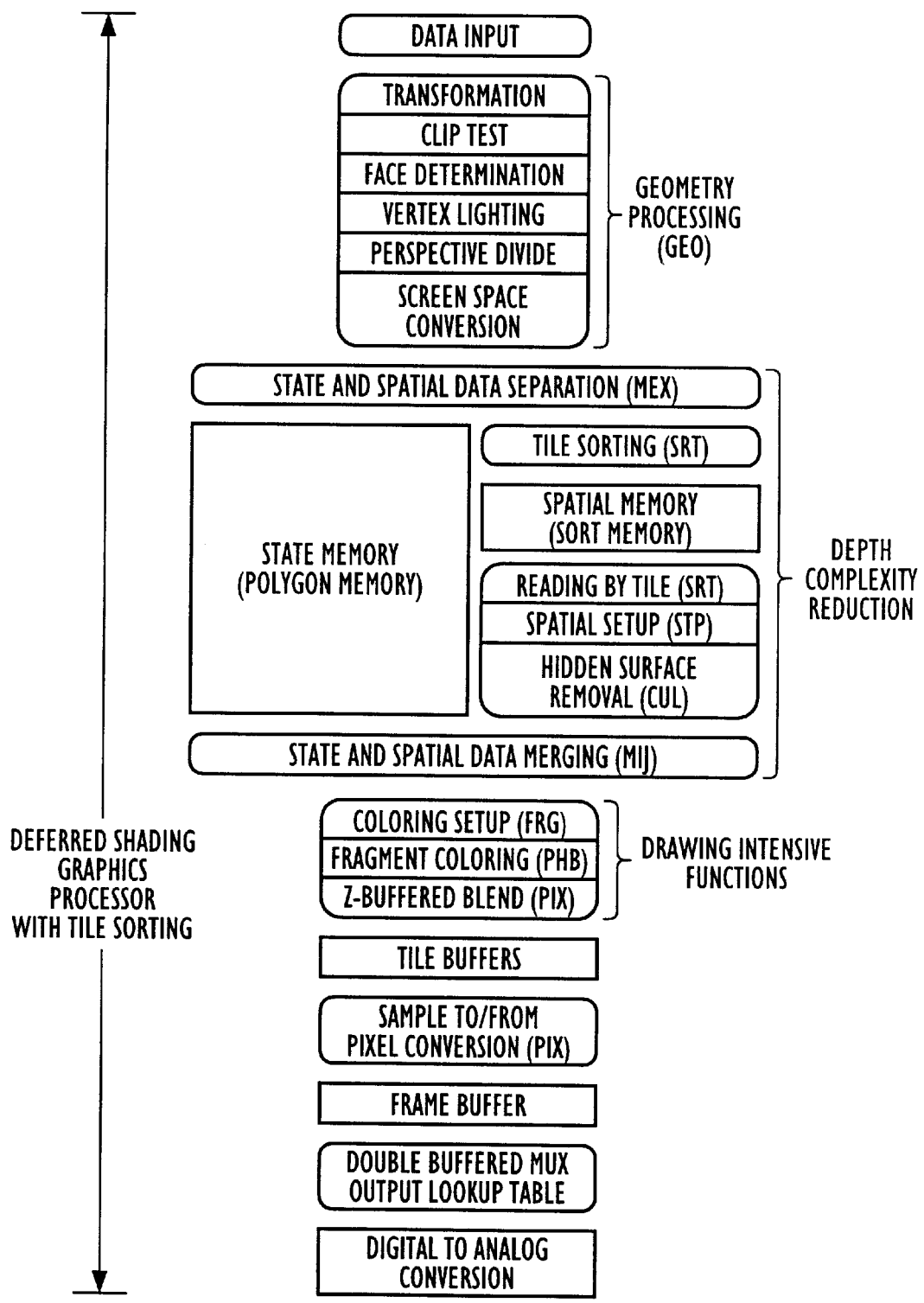
FIG. 4 is a diagrammatic illustration showing the processing path in another embodiment of the inventive 3D Deferred Shading Graphics Pipeline, with a MEX and MIJ steps, and also including a tile sorting step.

In contrast to the traditional graphics pipeline, the pipeline of the present invention defers rasterization (the system is sometimes called a deferred shader) until after hidden surface removal. Because many primitives are sent into the graphics pipeline, each corresponding to a particular setting of the pipeline state, multiple copies of pipeline state information must be stored until used by the rasterization process. The innovations of the present invention are an efficient method and apparatus for storing, retrieving, and managing the multiple copies of pipeline state information. One important innovation of the present invention is the splitting and subsequent merging of the data flow of the pipeline, as shown in FIG. 3. The separation is done by the MEX step in the data flow, and this allows for independently storing the state information and the spatial information in their corresponding memories. The merging is done in the MIJ step, thereby allowing visible (i.e., not guaranteed hidden) portions of polygons to be sent down the pipeline accompanied by only the necessary portions of state information. In the alternative embodiment of FIG. 4, additional steps for sorting by tile and reading by tile are added. As described later, a simplistic separation of state and spatial information is not optimal, and a more optimal separation is described with respect to another alternative embodiment of this invention.

Figure 5A:
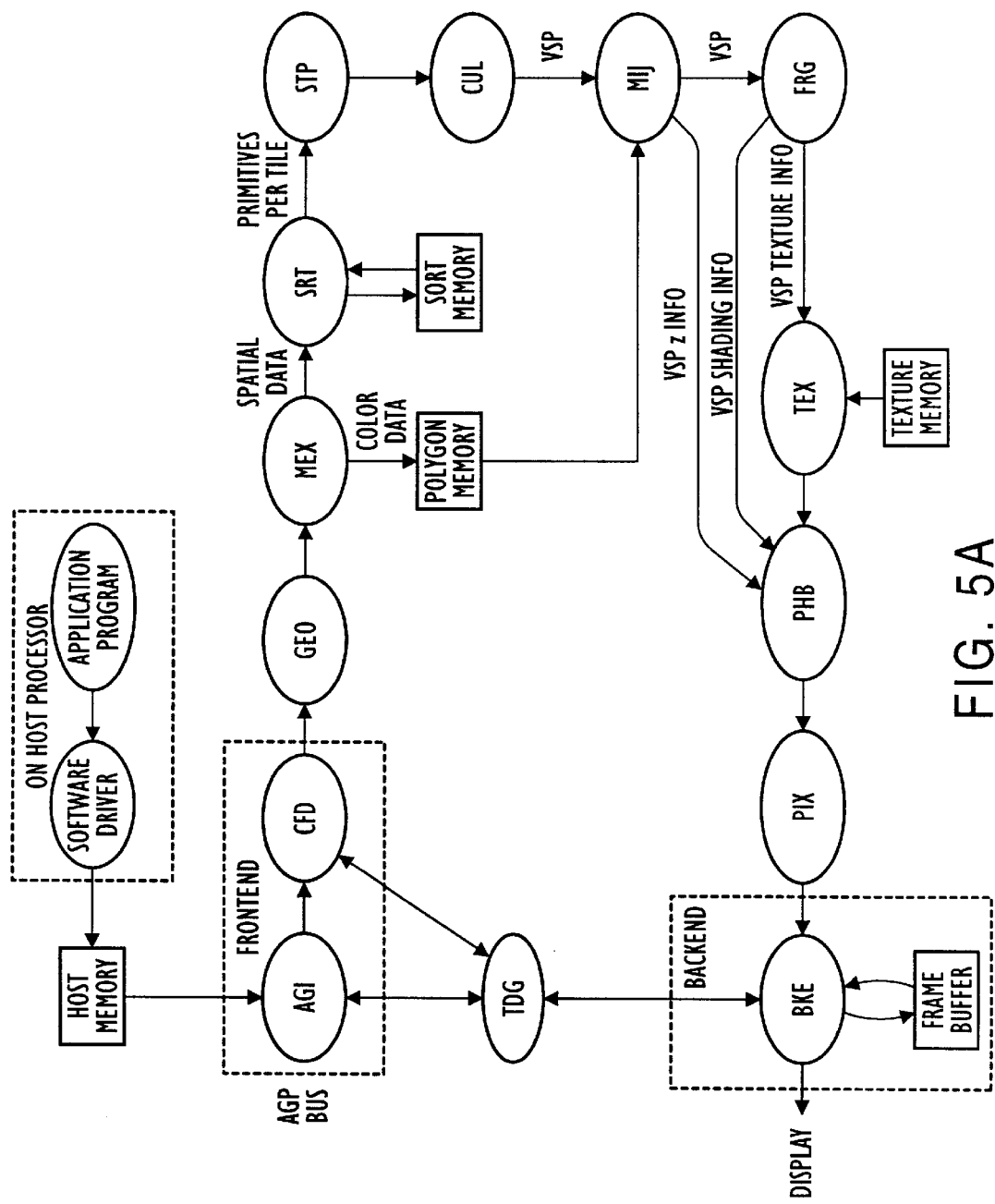
FIG. 5A is an alternative embodiment of the inventive 3D Deferred Shading Graphics Pipeline, showing information flow between blocks, starting with the application program running on a host processor.
Figure 5B:
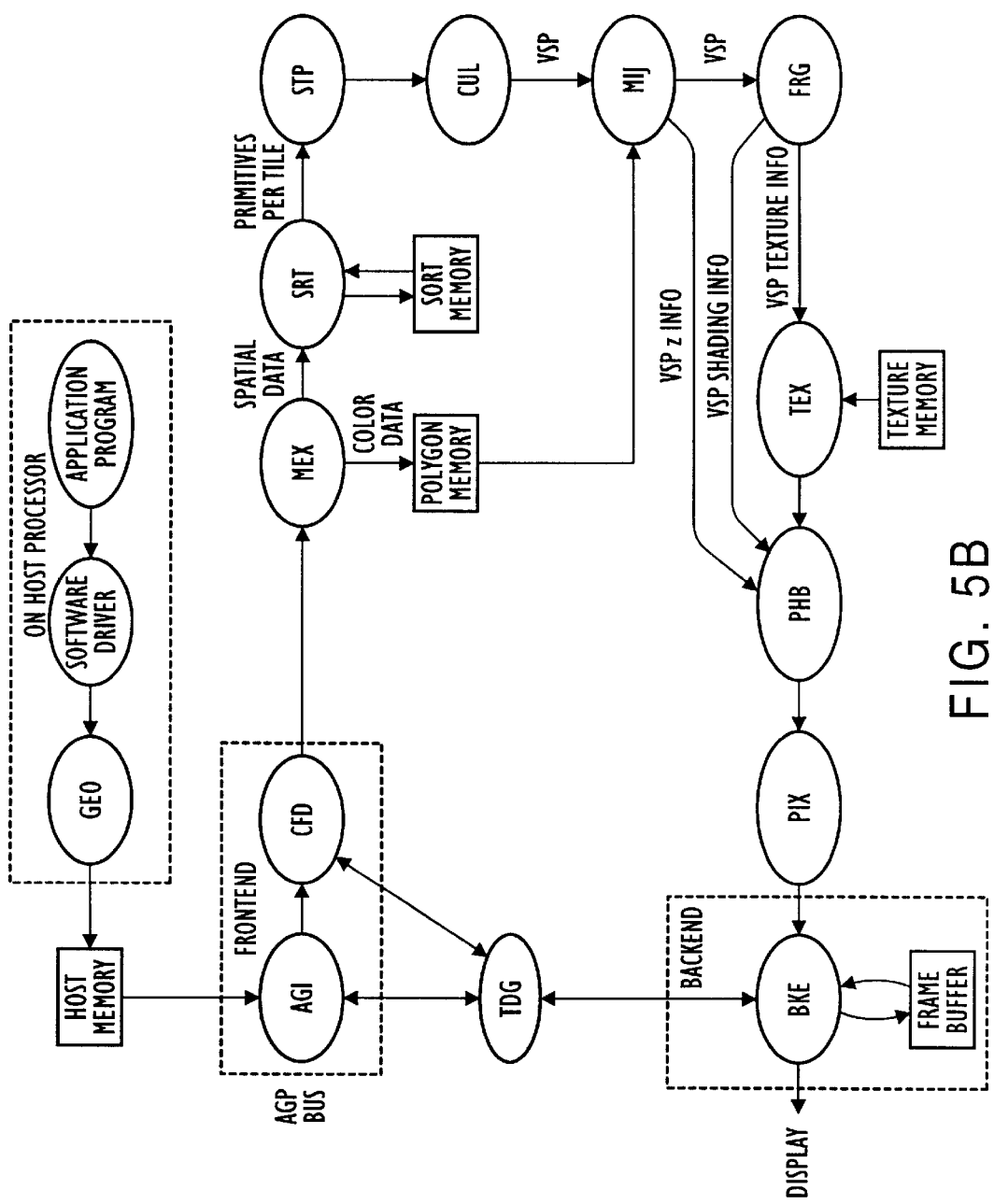
FIG. 5 is a diagrammatic illustration showing an embodiment of the inventive 3D Deferred Shading Graphics Pipeline, showing information flow between blocks, starting with the application program running on a host processor.

An embodiment of the invention will now be described. Referring to FIG. 5, the GEO (i.e., "geometry") block is the first computation unit at the front of the graphical pipeline. The GEO block receives the primitives in order, performs vertex operations (e.g., transformations, vertex lighting, clipping, and primitive assembly), and sends the data down the pipeline. The Front End, composed of the AGI (i.e., "advanced graphics interface") and CFD (i.e., "command fetch and decode") blocks deals with fetching (typically by PIO, programmed input/output, or DMA, direct memory access) and decoding the graphics hardware commands. The Front End loads the necessary transform matrices, material and light parameters and other pipeline state settings into the input registers of the GEO block. The GEO block sends a wide variety of data down the pipeline, such as transformed vertex coordinates, normals, generated and/or pass-through texture coordinates, per-vertex colors, material setting, light positions and parameters, and other shading parameters and operators. It is to be understood that FIG. 5 is one embodiment only, and other embodiments are also envisioned. For example, the CFD and GEO can be replaced with operations taking place in the software driver, application program, or operating system.

The MEX (i.e., "mode extraction") block is between the GEO and SRT blocks. The MEX block is responsible for saving sets of pipeline state settings and associating them with corresponding primitives. The Mode Injection (MIJ) block is responsible for the retrieval of the state and any other information associated with a primitive (via various pointers, hereinafter, generally called Color Pointers and material, light and mode (MLM) Pointers) when needed. MIJ is also responsible for the repackaging of the information as appropriate. An example of the repackaging occurs when the vertex data in Polygon Memory is retrieved and bundled into triangle input packets for the FRG block The MEX block receives data from the GEO block and separates the data stream into two parts: 1) spatial data, including vertices and any information needed for hidden surface removal (shown as V1, S2a, and S2b in FIG. 6); and 2) everything else (shown as V2 and S3 in FIG. 6). Spatial data are sent to the SRT (i.e., "sort") block, which stores the spatial data into a special buffer called Sort Memory. The "everything else"—light positions and parameters and other shading parameters and operators, colors, texture coordinates, and so on—is stored in another special buffer called Polygon Memory, where it can be retrieved by the MIJ (i.e., "mode injection") block. In one embodiment, Polygon Memory is multi buffered, so the MIJ block can read data for one frame, while the MEX block is storing data for another frame. The data stored in Polygon Memory falls into three major categories: 1) per-frame data (such as lighting, which generally changes a few times during a frame), 2) per-object data (such as material properties, which is generally different for each object in the scene); and 3) per-vertex data (such as color, surface normal, and texture coordinates, which generally have different values for each vertex in the frame). If desired, the MEX and MIJ blocks further divide these categories to optimize efficiency. An architecture may be more efficient if it minimizes memory use or alternatively if it minimizes data transmission. The categories chosen will affect these goods.

For each vertex, the MEX block sends the SRT block a Sort packet containing spatial data and a pointer into the Polygon Memory. (The pointer is called the Color Pointer, which is somewhat misleading, since it is used to retrieve information in addition to color.) The Sort packet also contains fields indicating whether the vertex represents a point, the endpoint of a line, or the corner of a triangle. To comply with order-dependent APIs (Application Program Interfaces), such as OpenGL and D3D, the vertices are sent in a strict time sequential order, the same order in which they were fed into the pipeline. (For an order independent API, the time sequential order could be perturbed.) The packet also specifies whether the current vertex is the last vertex in a given primitive (i.e., "completes" the primitive). In the case of triangle strips or fans, and line strips or loops, the vertices are shared between adjacent primitives. In this case, the packets indicate how to identify the other vertices in each primitive.

The SRT block receives vertices from the MEX block and sorts the resulting points, lines, and triangles by tile (i.e., by region within the screen). In multi-buffered Sort Memory, the SRT block maintains a list of vertices representing the graphic primitives, and a set of Tile Pointer Lists, one list for each tile in the frame. When SRT receives a vertex that completes a primitive (such as the third vertex in a triangle), it checks to see which tiles the primitive touches. For each tile a primitive touches, the SRT block adds a pointer to the vertex to that tile's Tile Pointer List. When the SRT block has finished sorting all the geometry in a frame (i.e. the frame is complete), it sends the data to the STP (i.e., "setup") block. For simplicity, each primitive output from the SRT block is contained in a single output packet, but an alternative would be to send one packet per vertex. SRT sends its output in tile-by-tile order: all of the primitives that touch a given tile, then all of the primitives that touch the next tile, and so on. Note that this means that SRT may send the same primitive many times, once for each tile it touches.

The MIJ block retrieves pipeline state information—such as colors, material properties, and so on—from the Polygon Memory and passes it downstream as required. To save bandwidth, the individual downstream blocks cache recently used pipeline state information. The MIJ block keeps track of what information is cached downstream, and only sends information as necessary. The MEX block in conjunction with the MIJ block is responsible for the management of graphics state related information.

The SRT block receives the time ordered data and bins it by tile. (Within each tile, the list is in time order.) The CUL (i.e., cull) block receives the data from the SRT block in tile order, and performs a hidden surface removal method (i.e., "culls" out parts of the primitives that definitely do not contribute to the final rendered image). The CUL block outputs packets that describe the portions of primitives that are visible (or potentially visible) in the final image. The FRG (i.e., fragment) block performs interpolation of primitive vertex values (for example, generating a surface normal vector for a location within a triangle from the three surface normal values located at the triangle vertices). The TEX block (i.e., texture) block and PHB (i.e., Phong and Bump) block receive the portions of primitives that are visible (or potentially visible) and are responsible for generating texture values and generating final fragment color values, respectively. The last block, the PIX (i.e., Pixel) block, consumes the final fragment colors to generate the final picture.

In one embodiment, the CUL block generates VSPs, where a VSP (Visible Stamp Portion) corresponds to the visible (or potentially visible) portion of a polygon on a stamp, where a "stamp" is a plurality of adjacent pixels. An example stamp configuration is a block of four adjacent pixels in a 2×2 pixel subarray. In one embodiment, a stamp is configured such that the CUL block is capable of processing, in a pipelined manner, a hidden surface removal method on a stamp with the throughput of one stamp per clock cycle.

A primitive may touch many tiles and therefore, unlike traditional rendering pipelines, may be visited many times during the course of rendering the frame. The pipeline must remember the graphics state in effect at the time the primitive entered the pipeline, and recall it every time it is visited by the pipeline stages downstream from SRT.

The blocks downstream from MIJ (i.e., FRG, TEX, PHB, and PIX) each have one or more data caches that are managed by MIJ. MIJ includes a multiplicity of tag RAMs corresponding to these data caches, and these tag RAMs are generally implemented as fully associative memories (i.e., content addressable memories). The tag RAMs store the address in Polygon Memory (or other unique identifier, such as a unique part of the address bits) for each piece of information that is cached downstream. When a VSP is output from CUL to MIJ, the MIJ block determines the addresses of the state information needed to generate the final color values for the pixels in that VSP, then feeds these addresses into the tag RAMs, thereby identifying the pieces of state information that already reside in the data caches, and therefore, by process of elimination, determines which pieces of state information are missing from the data caches. The missing state information is read from Polygon Memory and sent down the pipeline, ahead of the corresponding VSP, and written into the data caches. As VSPs are sent from MIJ, indices into the data caches (i.e., the addresses into the caches) are added, allowing the downstream blocks to locate the state information in their data caches. When the VSP reaches the downstream blocks, the needed state information is guaranteed to reside in the data caches at the time it is needed, and is found using the supplied indices. Hence, the data caches are always "hit".

Figure 6:
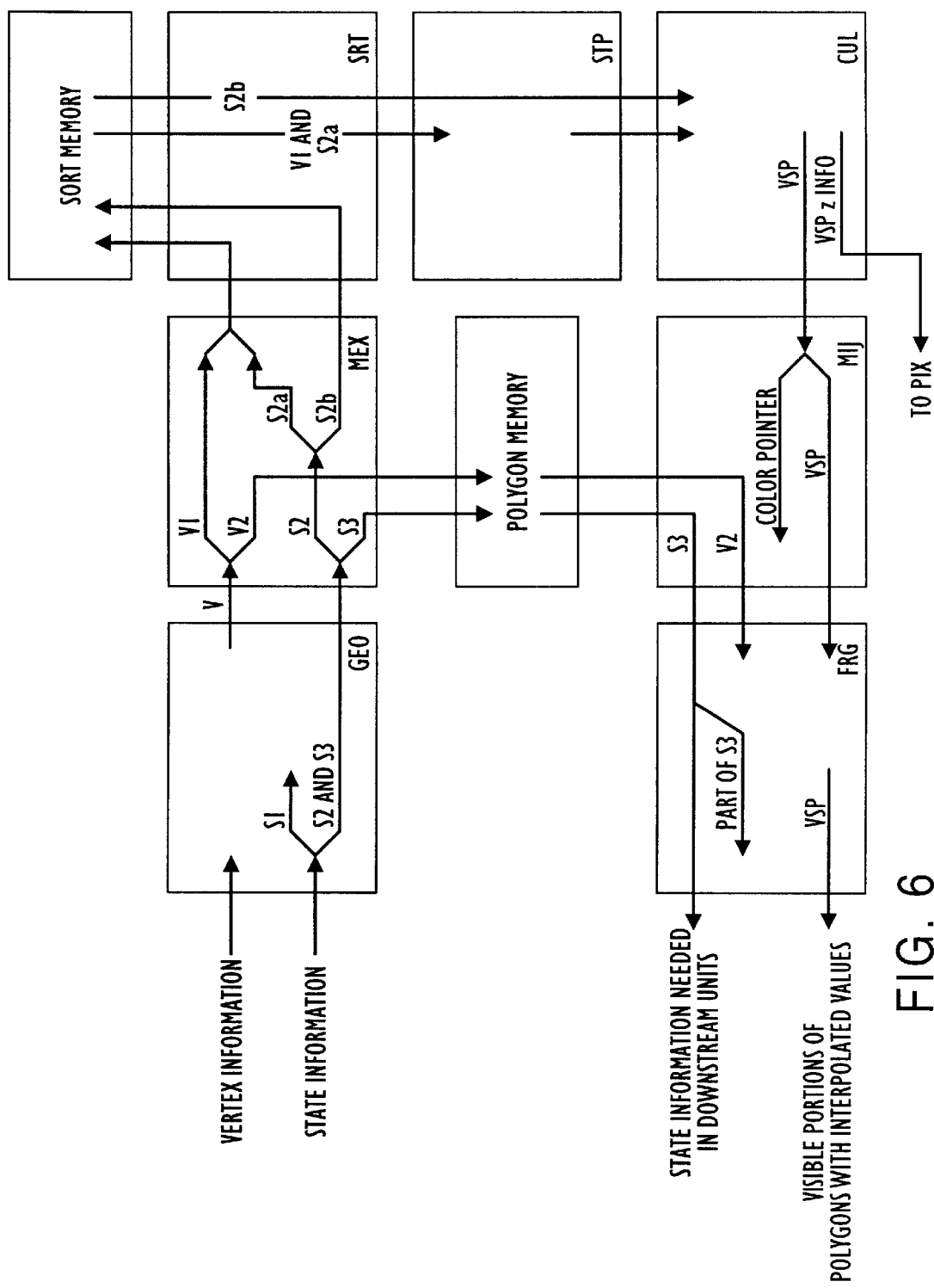
FIG. 6 is a diagrammatic illustration showing an exemplary flow of data through blocks of a portion of an embodiment of a pipeline of this invention.

FIG. 6 shows the GEO to FRG part of the pipeline, and illustrates state information and vertex information flow (other information flow, such as BeginFrame packets, End-Frame packets, and Clear packets are not shown) through one embodiment of this invention. Vertex information is received from a system processor or from a Host Memory (FIG. 5) by the CFD block. CFD obtains and performs any needed format conversions on the vertex information and passes it to the GEO block. Similarly, state information, generally generated by the application software, is received by CFD and passed to GEO. State information is divided into three general types:

S1. State information which is consumed in GEO. This type of state information typically comprises transform matrices and lighting and material information that is only used for vertex-based lighting (e.g. Gouraud shading).

S2. State information which is needed for hidden surface removal (HSR), which in turn consists of two sub-types:

S2a) that which can possibly change frequently, and is thus stored with vertex data in Sort Memory, generally in the same memory packet: In this embodiment, this type of state information typically comprises the primitive type, type of depth test (e.g., OpenGL "DepthFunc"), the depth test enable bit, the depth write mask bit, line mode indicator bit, line width, point width, per-primitive line stipple information, frequently changing hidden surface removal function control bits, and polygon offset enable bit.

S2b) that which is not likely to change much, and is stored in Cull Mode packets in Sort Memory . In this embodiment, this type of state information typically comprises scissor test settings, antialiasing enable bit(s), line stipple information that is not per-primitive, infrequently changing hidden surface removal function control bits, and polygon offset information.

S3. State information which is needed for rasterization (per Pixel processing) which is stored in Polygon Memory. This type of state typically comprises the per-frame data and per-object data, and generally includes pipeline mode selection (e.g., sorted transparency mode selection), lighting parameter setting for a multiplicity of lights, and material properties and other shading properties. MEX stores state information S3 in Polygon Memory for future use.

Note that the typical division between state information S2a and S2b is implementation dependent, and any particular state parameter could be moved from one sub-type to the other. This division may also be tuned to a particular application.

As shown in FIG. 6, GEO processes vertex information and passes the resultant vertex information V to MEX. The resultant vertex information V is separated by GEO into two groups:

V1. Any per-vertex information that is needed for hidden surface removal, including screen coordinate vertex locations. This information is passed to SRT, where it is stored, combined with state information S2a, in Sort Memory for later use.

V2. Per-vertex state information that is not needed for hidden surface removal, generally including texture coordinates, the vertex location in eye coordinate s, surface normals, and vertex colors and shading parameters. This information is stored into Polygon Memory for later use.

Other packets that get sent into the pipeline include: the BeginFrame packet , that indicates the start of a block of data to be processed and stored into Sort Memory and Polygon Memory; the EndFrame packet, that indicates the end of the block of data; and the Clear packet, that indicates one or more buffer clear operations are to be performed.

Figure 7:
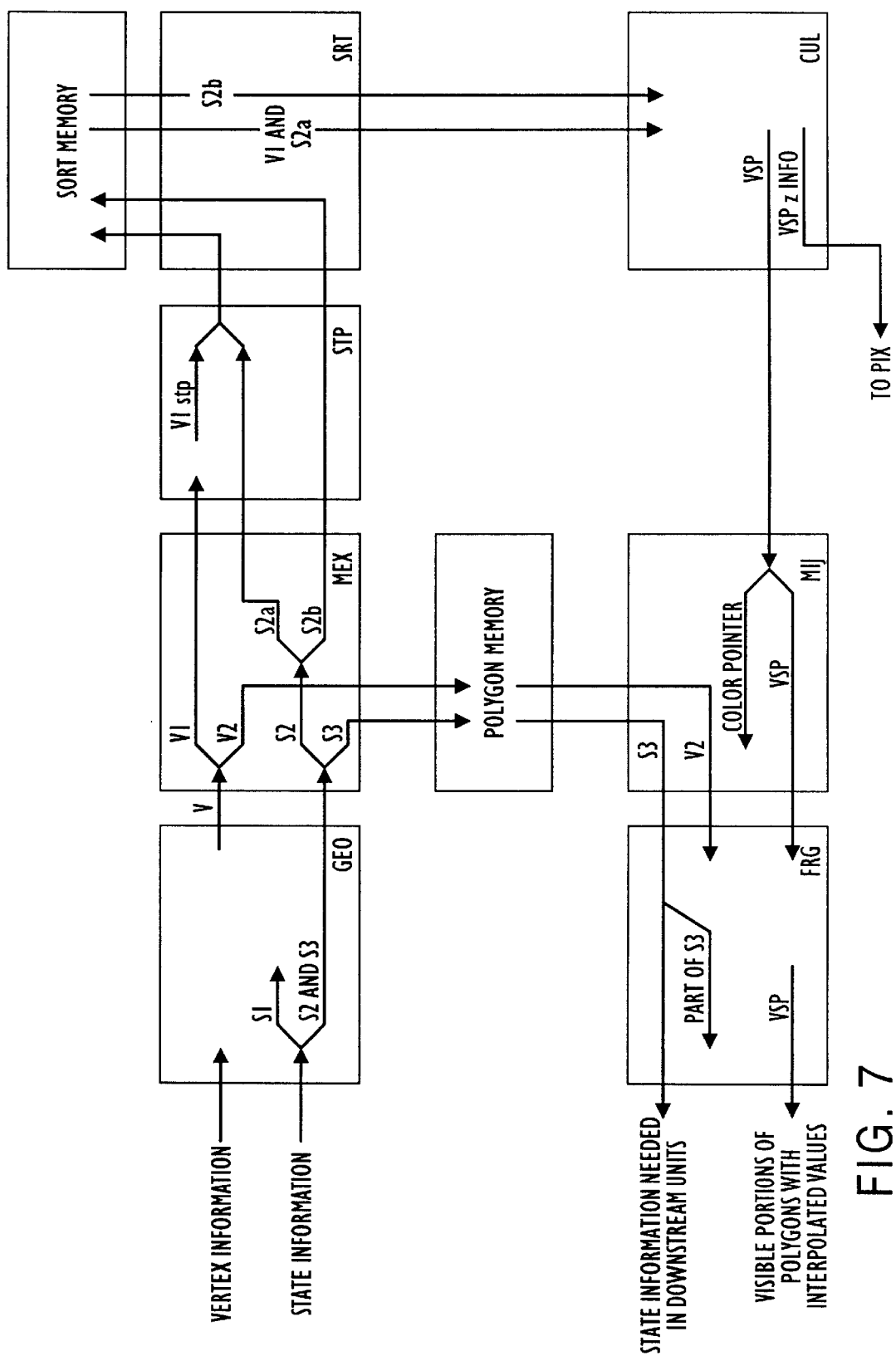
FIG. 7 is a diagrammatic illustration showing an another exemplary flow of data through blocks of a portion of an embodiment of a pipeline of this invention, with the STP function occuring before the SRT function.

An alternate embodiment is shown in FIG. 7, where the STP step occurs before the SRT step. This has the advantage of reducing total computation because, in the embodiment of FIG. 6, the STP step would be performed on the same primitive multiple times (once for each time it is read from Sort Memory). However, the embodiment of FIG. 7 has the disadvantage of requiring a larger amount of Sort Memory because more data will be stored there.

Figure 8:
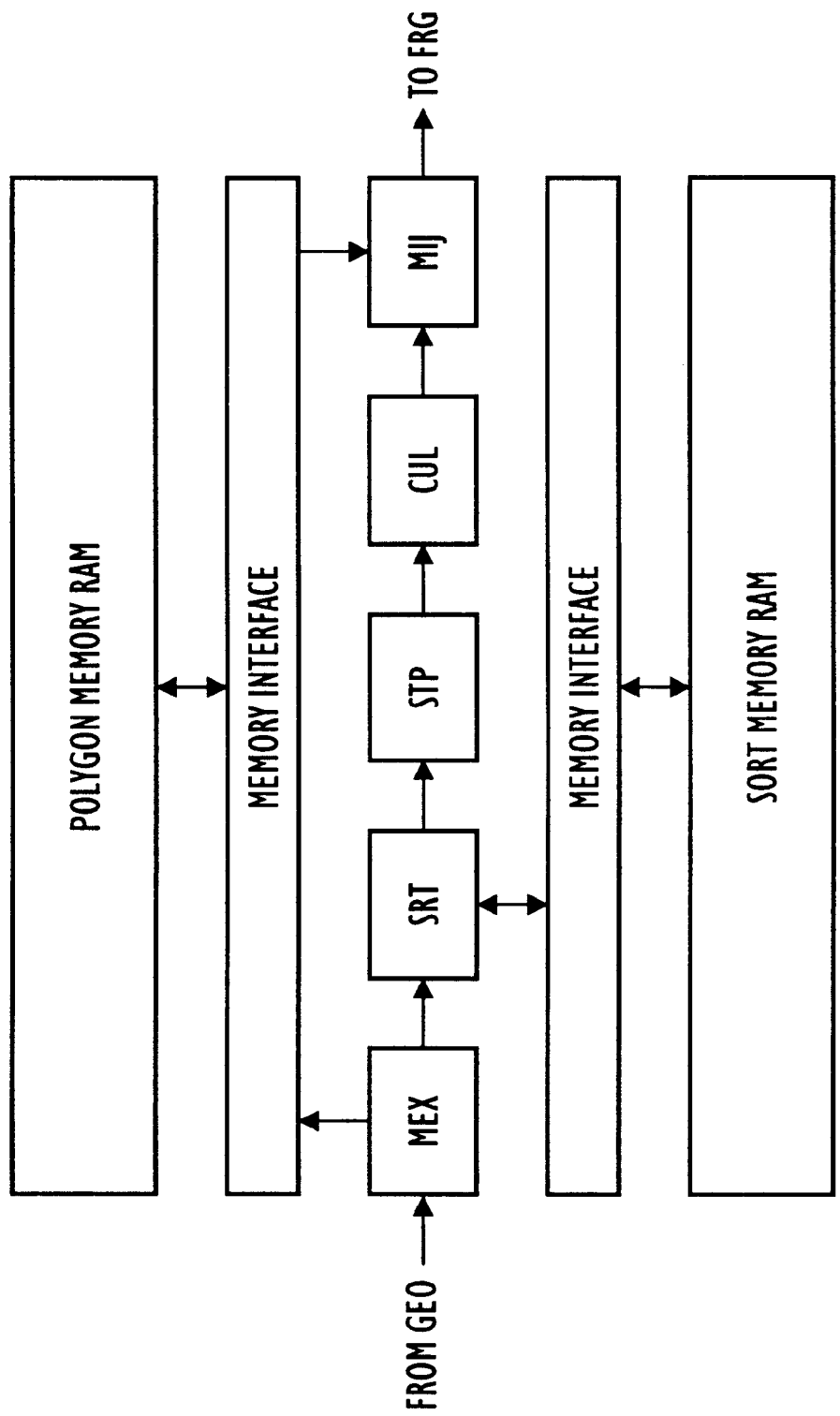
FIG. 8 is a diagrammatic illustration showing an exemplary configuration of RAM interfaces used by MEX, MIJ, and SRT.
Figure 9:
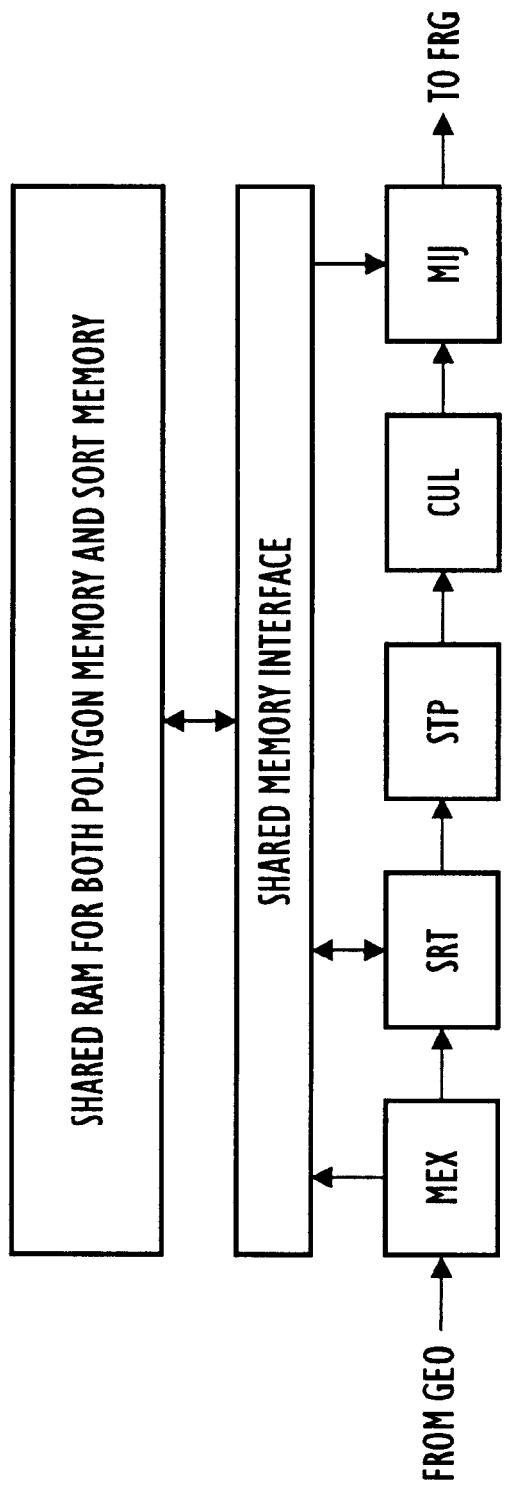
FIG. 9 is a diagrammatic illustration showing another exemplary configuration of a shared RAM interface used by MEX, MIJ, and SRT.

In one embodiment, MEX and MIJ share a common memory interface to Polygon Memory RAM, as shown in FIG. 8, while SRT has a dedicated memory interface to Sort memory. As an alternative, MEX, SRT, and MIJ can share the same memory interface, as shown in FIG. 9. This has the advantage of making more efficient use of memory, but requires the memory interface to arbitrate between the three units. The RAM shown in FIG. 8 and FIG. 9 would generally be dynamic memory (DRAM) that is external to the integrated circuits with the MEX, SRT, and MIJ functions; however imbedded DRAM could be used. In the preferred embodiment, RAMBUS DRAM (RDRAM) is used, and more specifically, Direct RAMBUS DRAM (DRDRAM) is used.

System Details

Mode Extraction (MEX) Block

The MEX block is responsible for the following:

1. Receiving packets from SEO.
2. Performing any reprocessing needed on those data packets.
3. Appropriately saving the information needed by the shading portion of the pipeline (for retrieval later by MIJ) in Polygon Memory.
4. Attaching state pointers to primitives sent to SRT, so that MIJ knows the state associated with this primitive.
5. Sending the information needed by SRT, STP, and CUL to the SRT block.
6. Handling Polygon Memory and Sort Memory overflow.

The SRT-STP-CUL part of the pipeline determines which portions of primitives are not guaranteed to be hidden, and sends these portions down the pipeline (each of these portions are hereinafter called a VSP). VSPs are composed of one or more pixels which need further processing, and pixels within a VSP are from the same primitive. The pixels (or samples) within these VSPs are then shaded by the FRG-TEX-PHB part of the pipeline. (Hereinafter, "shade" will mean any operations needed to generate color and depth values for pixels, and generally includes texturing and lighting.) The VSPs output from the CUL block to MIJ block are not necessarily ordered by primitive. If CUL outputs VSPs in spatial order, the VSPs will be in scan order on the tile (i.e., the VSPs for different primitives may be interleaved because they are output across rows within a tile). The FRG-TEX-PHB part of the pipeline needs to know which primitive a particular VSP belongs to; as well as the graphics state at the time that primitive was first introduced. MEX associates a Color Pointer with each vertex as the vertex is sent to SRT, thereby creating a link between the vertex information V1 and the corresponding vertex information V2. Color Pointers are passed along through the SRT-STP-CUL part of the pipeline, and are included in VSPS. This linkage allows MIJ to retrieve, from Polygon Memory, the vertex information V2 that is needed to shade the pixels in any particular VSP. MIJ also locates in Polygon Memory, via the MLM Pointers, the pipeline state information S3 that is also needed for shading of VSPs, and sends this information down the pipeline.

MEX thus needs to accumulate any state changes that have occurred since the last state save. The state changes become effective as soon as a vertex or in a general pipeline a command that indicates a "draw" command (in a Sort packet) is encountered. MEX keeps the MEX State Vector in on-chip memory or registers. In one embodiment, MEX needs more than 1k bytes of on-chip memory to store the MEX State Vector. This is a significant amount of information needed for every vertex, given the large number of vertices passing down the pipeline. In accordance with one aspect of the present invention, therefore, state data is partitioned and stored in Polygon Memory such that a particular setting for a partition is stored once and recalled a minimal number of times as needed for all vertices to which it pertains.

MIJ (Mode Injection) Block

The Mode Injection block resides between the CUL block and the rest of the downstream 3D pipeline. MIJ receives the control and VSP packets from the CUL block. On the output side, MIJ interfaces with the FRG and PIX blocks.

The MIJ block is responsible for the following:

1. Routing various control packets such as BeginFrame, EndFrame, and BeginTile to FRG and PIX units.
2. Routing prefetch packets from SRT to PIX.
3. Using Color Pointers to locate (generally this means generating an address) vertex information V2 for all the vertices of the primitive corresponding to the VSP and to also locate the MLM Pointers associated with the primitive.
5. Determining whether MLM Pointers need to be read from Polygon Memory and reading them when necessary.
7. Keeping track of the contents of the State Caches. In one embodiment, these state caches are: Color, TexA, TexB, Light, and Material caches (for the FRGt, TEX, and PHB blocks) and PixelMode and Stipple caches (for the PIX block) and associating the appropriate cache pointer to each cache miss data packet.
8. Determining which packets (vertex information V2 and/or pipeline state information S2b) need to be retrieved from Polygon Memory by determining when cache misses occur, and then retrieving the packets.
9. Constructing cache fill packets from the packets retrieved from Polygon Memory and sending them down the pipeline to data caches. (In one embodiment, the data caches are in the FRG, TEX, PHB, and PIX blocks.).
10. Sending data to the fragment and pixel blocks.
11. Processing stalls in the pipeline.
12. Signaling to MEX when the frame is done.
13. Associating the state with each VSP received from the CUL block.

MIJ thus deals with the retrieval of state as well as the per-vertex data needed for computing the final colors for each fragment in the VSP. The entire state can be recreated from the information kept in the relatively small Color Pointer.

MIJ receives VSP packets from the CUL block. The VSPs output from the CUL block to MIJ are not necessarily ordered by primitives. In most cases, they will be in the VSP scan order on the tile, i.e. the VSPs for different primitives may be interleaved. In order to light, texture and composite the fragments in the VSPs, the pipeline stages downstream from the MIJ block need information about the type of the primitive (e.g., point, line, triangle, line-mode triangle); its vertex information V2 (such as window and eye coordinates, normal, color, and texture coordinates at the vertices of the primitive); and the state information S3 that was active when the primitive was received by MEX. State information S2 is not needed downstream of MIJ.

MIJ starts working on a frame after it receives a BeginFrame packet from CUL. The VSP processing for the frame begins when CUL outputs the first VSP for the frame.

The MEX State Vector

Figure 10:
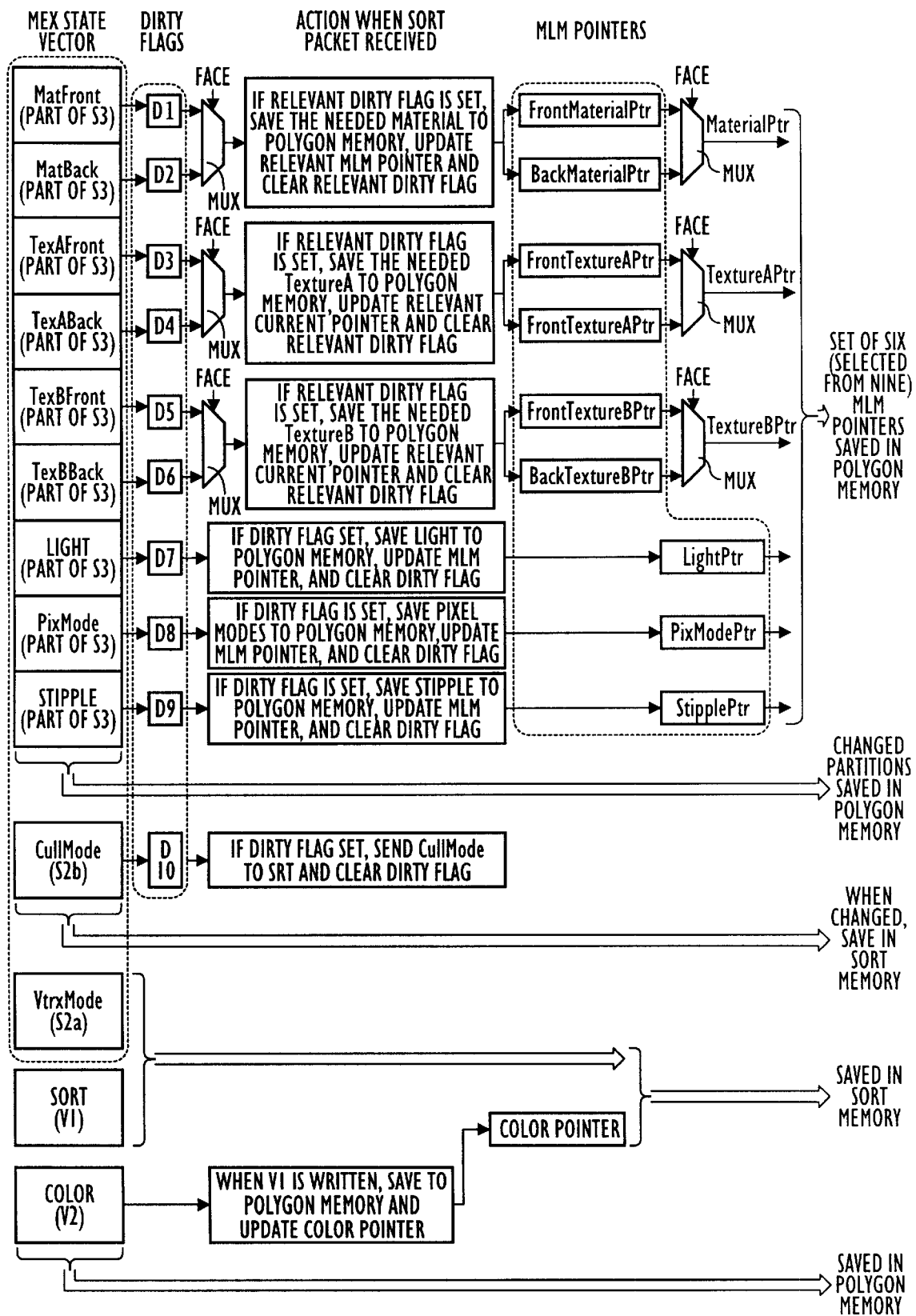
FIG. 10 is a diagrammatic illustration showing aspects of a process for saving information to Polygon Memory and Sort Memory.

For state information S3, MEX receives the relevant state packets and maintains a copy of the most recently received state information S3 in the MEX State Vector. The MEX State Vector is divided into a multiplicity of state partitions. FIG. 10 shows the partitioning used in one embodiment, which uses nine partitions for state information S3. FIG. 10 depicts the names the various state packets that update state information S3 in the MEX State Vector. These packets are: MatFront packet, describing shading properties and operations of the front face of a primitive; MatBack packet, describing shading properties and operations of the back face of a primitive; TexAFront packet, describing the properties of the first two textures of the front face of a primitive; TexABack packet, describing the properties and operations of the first two textures of the back face of a primitive; TexBFront packet, describing the properties and operations of the rest of the textures of the front face of a primitive; TexBBack packet, describing the properties and operations of the rest of the textures of the back face of a primitive; Light packet, describing the light setting and operations; PixMode packet, describing the per-fragment operation parameters and operations done in the PIX block; and Stipple packet, describing the stipple parameters and operations. When a partition within the MEX State Vector has changed, and may need to be saved for later use, its corresponding one of Dirty Flag D1 through D9 is, in one embodiment, asserted, indicating a change in that partition has occurred. FIG. 10 shows the partitions within the MEX State Vector that have Dirty Flags.

The Light partition of the MEX State Vector contains information for a multiplicity of lights used in fragment lighting computations as well as the global state affecting the lighting of a fragment such as the fog parameters and other shading parameters and operations, etc. The Light packet generally includes the following per-light information: light type, attenuation constants, spotlight parameters, light positional information, and light color information (including ambient, diffuse, and specular colors). In this embodiment, the light cache packet also includes the following global lighting information: global ambient lighting, fog parameters, and number of lights in use.

When the Light packet describes eight lights, the Light packet is about 300 bytes, (approximately 300 bits for each of the eight lights plus 120 bits of global light modes). In one embodiment, the Light packet is generated by the driver or application software and sent to MEX via the GEO block. The GEO block does not use any of this information.

Rather than storing the lighting state as one big block of data, an alternative is to store per-light data, so that each light can be managed separately. This would allow less data to be transmitted down the pipeline when there is a light parameter cache miss in MIJ. Thus, application programs would be provided "lighter weight" switching of lighting parameters when a single light is changed.

For state information S2, MEX maintains two partitions, one for state information S2a and one for state information S2b. State information S2a (received in VrtxMode packets) is always saved into Sort Memory with every vertex, so it does not need a Dirty Flag. State information S2b (received in CullMode packets) is only saved into Sort Memory when it has been changed and a new vertex is received, thus it requires a Dirty Flag (D10). The information in CullMode and VrtxMode packets is sent to the Sort-SetupCull part of the pipeline.

The packets described do not need to update the entire corresponding partition of the MEX State Vector, but could, for example, update a single parameter within the partition. This would make the packets smaller, but the packet would need to indicate which parameters are being updated.

When MEX receives a Sort packet containing vertex information V1 (specifying a vertex location), the state associated with that vertex is the copy of the most recently received state (i.e., the current values of vertex information V2 and state information S2a, S2b, and S3). Vertex information V2 (in Color packets) is received before vertex information V1 (received in Sort packets). The Sort packet consists of the information needed for sorting and culling of primitives, such as the window coordinates of the vertex (generally clipped to the window area) and primitive type. The Color packet consists of per-vertex information needed for lighting, texturing, and shading of primitives such as the vertex eye-coordinates, vertex normals, texture coordinates, etc. and is saved in Polygon Memory to be retrieved later. Because the amount of per-vertex information varies with the visual complexity of the 3D object (e.g., there is a variable number of texture coordinates, and the need for eye coordinate vertex locations depends on whether local lights or local viewer is used), one embodiment allows Color packets to vary in length. The Color Pointer that is stored with every vertex indicates the location of the corresponding Color packet in Polygon Memory. Some shading data and operators change frequently, others less frequently, these may be saved in different structures or may be saved in one structure.

In one embodiment, in MEX, there is no default reset of state vectors. It is the responsibility of the driver/software to make sure that all state is initialized appropriately. To simplify addressing, all vertices in a mesh are the same size.

Dirty Flags and MLM Pointer Generation

MEX keeps a Dirty Flag and a pointer (into Polygon Memory) for each partition in the state information S3 and some of the partitions in state information S2. Thus, in the embodiment of FIG. 10, there are 10 Dirty Flags and 9 mode pointers, since CullMode does not get saved in the Polygon Memory and therefore does not require a pointer. Every time MEX receives an input packet containing pipeline state, it updates the corresponding portions of the MEX State Vector. For each state partition that is updated, MEX also sets the Dirty Flag corresponding to that partition.

When MEX receives a Sort packet (i.e. vertex information V1), it examines the Dirty Flags to see if any part of the state information S3 has been updated since the last save. All state partitions that have been updated (indicated by their Dirty Flags being set) and are relevant (i.e., the correct face) to the rendering of the current primitive are saved to the Polygon Memory, their pointers updated, and their Dirty Flags are cleared. Note that some partitions of the MEX State Vector come in a back-front pair (e.g., MatBack and MatFront), which means only one of the two of more in the set are relevant for a particular primitive. For example, if the Dirty Bits for both TexABack and TexAFront are set, and the primitive completed by a Sort packet is deemed to be front facing, then TexAFront is saved to Polygon Memory, the FrontTextureAPtr is copied to the TextureAPtr pointer within the set of six MLM Pointers that get written to Polygon Memory, and the Dirty Flag for TexAFront is cleared. In this example, the Dirty Flag for TexABack is unaffected and remains set. This selection process is shown schematically in FIG. 10 by the "mux" (i.e., multiplexor) operators.

Each MLM Pointer points to the location of a partition of the MEX State Vector that has been stored into Polygon Memory. If each stored partition has a size that is a multiple of some smaller memory block (e.g. each partition is a multiple of a sixteen byte memory block), then each MLM Pointer is the block number in Polygon Memory, thereby saving bits in each MLM Pointer. For example, if a page of Polygon Memory is 32 MM (i.e. $2^{25}$ bytes), and each block is 16 bytes, then each MLM Pointer is 21 bits. All pointers into Polygon Memory and Sort Memory can take advantage of the memory block size to save address bits.

In one embodiment, Polygon Memory is implemented using Rambus Memory, and in particular, Direct Rambus Dynamic Random Access Memory (DRDRAM). For DRDRAM, the most easily accessible memory block size is a "dualoct", which is sixteen nine-bit bytes, or a total of 144 bits, which is also eighteen eight-bit bytes. With a set of six MLM Pointer stored in one 144-bit dualoct, each MLM Pointer can be 24 bits. With 24-bit values for an MLM pointer, a page of Polygon Memory can be 256 MB. In the following examples, MLM Pointers are assumed to be 24-bit numbers.

MLM Pointers are used because state information S3 can be shared amongst many primitives. However, storing a set of six MLM Pointers could require about 16 bytes, which would be a very large storage overhead to be included in each vertex. Therefore, a set of six MLM Pointers is shared amongst a multiplicity of vertices, but this can only be done if the vertices share the exact same state information S3 (that is, the vertices would have the same set of six MLM Pointers). Fortunately, 3D application programs generally render many vertices with the same state information S3. If fact, most APIs require the state information S3 to be constant for all the vertices in a polygon mesh (or, line strips, triangle strips, etc.). In the case of the OpenGL API, state information S3 must remain unchanged between "glBegin" and "glEnd" statements.

Color Pointer Generation

Figure 12:
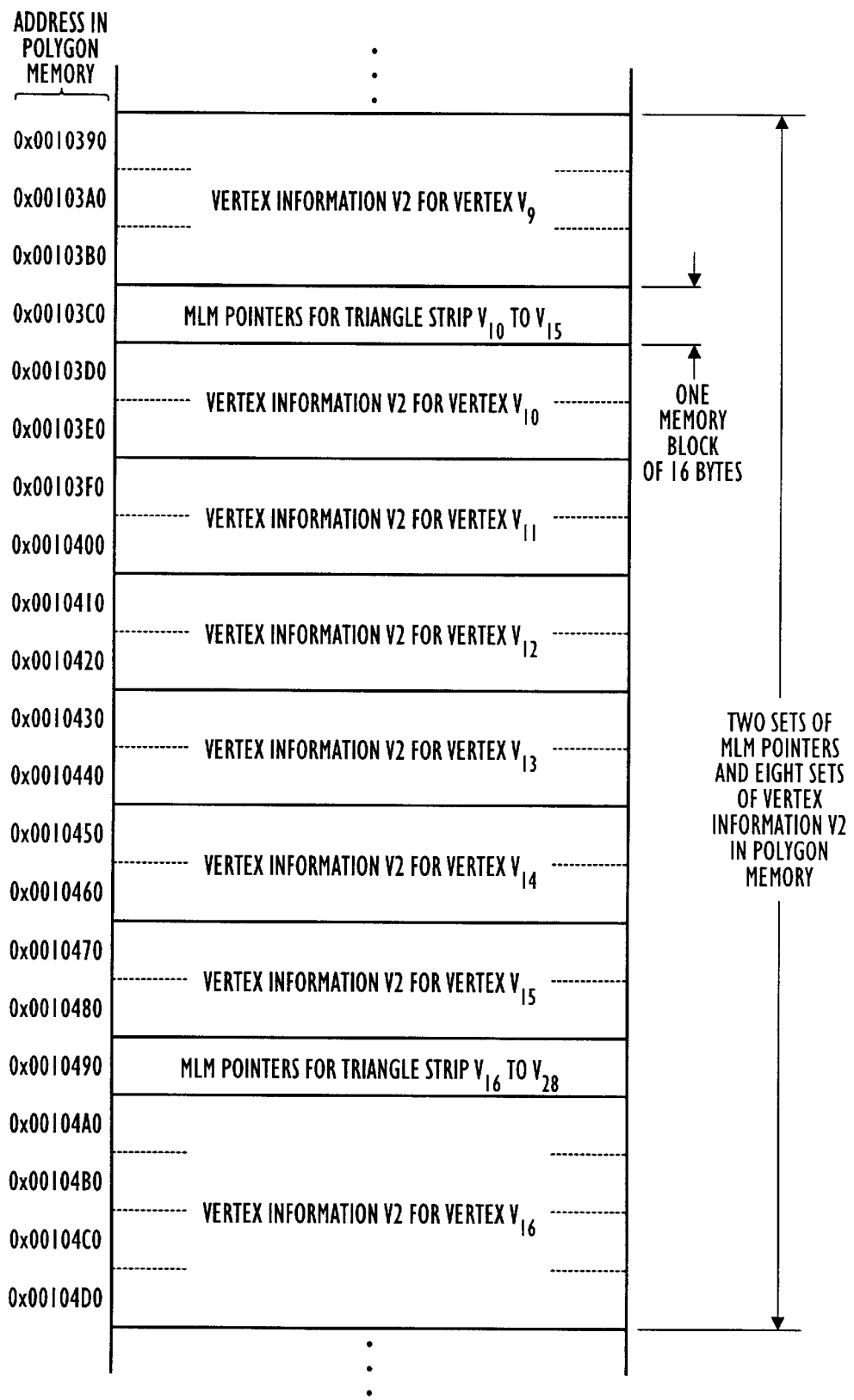
FIG. 12 is a diagrammatic illustration showing an exemplary way to store vertex information V2 into Polygon Memory, including six entries corresponding to the six vertices in the example shown in FIG. 11.

There are many possible variations to design the Color Pointer function, so only one embodiment will be described. FIG. 11 shows an example triangle strip with four triangles, composed of six vertices. Also shown in the example of FIG. 11 is the six corresponding vertex entries in Sort Memory, each entry including four fields within each Color Pointer: ColorAddress; ColorOffset; ColorType; and ColorSize. As described earlier, the Color Pointer is used to locate the vertex information V2 within Polygon Memory, and the ColorAddress field indicates the first memory block (in this example, a memory block is sixteen bytes). Also shown in FIG. 11 is the Sort Primitive Type parameter in each Sort Memory entry; this parameter describes how the vertices are joined by SRT to create primitives, where the possible choices include: tri_strip (triangle strip); tri_fan (triangle fan); line_loop; line_strip; point; etc. In operation, many parameters in a Sort Memory entry are not needed if the corresponding vertex does not complete a primitive. In FIG. 11, these unneeded parameters are in $V_{10}$ and $V_{11}$, and the unused parameters are: Sort Primitive Type; state information S2a; and all parameters within the Color Pointer. FIG. 12 continues the example in FIG. 11 and shows two sets of MLM Pointers and eight sets of vertex information V2 in Polygon Memory.

The address of vertex information V2 in Polygon Memory is found by multiplying the ColorAddress by the memory block size. As an example, let us consider $V_{12}$ as described in FIG. 11 and FIG. 12. Its ColorAddress, 0x001041, is multiplied by 0x10 to get the address of 0x00410. This computed address is the location of the first byte in the vertex information V2 for that vertex. The amount of data in the vertex information V2 for this vertex is indicated by the ColorSize parameter; and, in the example, ColorSize equals 0x02, indicating two memory blocks are used, for a total of 32 bytes. The ColorOffest and ColorSize parameters are used to locate the MLM Pointers by the formula (where B is the memory block size):

(Address of MLM Pointers)=(ColorAddress*B)−(ColorSize*ColorOffset+1) *B

The ColorType parameter indicates the type of primitive (triangle, line, point, etc.) and whether the primitive is part of a triangle mesh, line loop, line strip, list of points, etc. The ColorType is needed to find the vertex information V3 for all the vertices of the primitive.

The Color Pointer included in a VSP is the Color Pointer of the corresponding primitive's completing vertex. That is, the last vertex in the primitive, which is the $3^{rd}$ vertex for a triangle, $2^{nd}$ for a line, etc.

In the preceding discussion, the ColorSize parameter was described as binary coded number. However, a more optimal implementation would have this parameter as a descriptor, or index, into a table of sizes. Hence, in one embodiment, a 3-bit parameter specifies eight sizes of entries in Polygon Memory, ranging, for example, from one to fourteen memory blocks.

The maximum number of vertices in a mesh (in MEX) depends on the number of bits in the ColorOffset parameter in the Color Pointer. For example, if the ColorOffset is eight bits, then the maximum number of vertices in a mesh is 256. Whenever an application program specifies a mesh with more than the maximum number of vertices that MEX can handle, the software driver must split the mesh into smaller meshes. In one alternative embodiment, MEX does this splitting of meshes automatically, although it is noted that the complexity is not generally justified because most application programs do not use large meshes.

Clear Packets and Clear Operations

In addition to the packets described above, Clear Packets are also sent down the pipeline. These packets specify buffer clear operations that set some portion of the depth values, color values, and/or stencil values to a specific set of values. For use in CUL, Clear Packets include the depth clear value. Note that Clear packets are also processed similarly, with MEX treating buffer clear operations as a "primitive" because they are associated with pipeline state information stored in Polygon Memory. Therefore, the Clear Packet stored into Sort Memory includes a Color Pointer, and therefore is associated with a set of MLM Pointers; and, if Dirty Flags are set in MEX, then state information S3 is written to Polygon Memory.

In one embodiment, which provides improved efficiency for Clear Packets, all the needed state information S3 needed for buffer clears is completely contained within a single partition within the MEX State Vector (in one embodiment, this is the PixMode partition of the MEX State Vector). This allows the Color Pointer in the Clear Packet to be replaced by a single MLM Pointer (the PixModePtr). This, in turn, means that only the Dirty Flag for the PixMode partition needs to be examined, and only that partition is conditionally written into Polygon Memory. Other Dirty Flags are left unaffected by Clear Packets.

In another embodiment, Clear Packets take advantage of circumstances where none of the data in the MEX State Vector is needed. This is accomplished with a special bit, called "SendToPixel", included in the Clear packet. If this bit is asserted, then the clear operation is known to uniformly affect all the values in one or more buffers (i.e., one or more of: depth buffer, color buffer, and/or the stencil buffer) for a particular display screen (i.e., window). Specifically, this clear operation is not affected by scissor operations or any bit masking. If SendToPixel is asserted, and no geometry has been sent down the pipeline yet for a given tile, then the clear operation can be incorporated into the Begin Tile packet (not send along as a separate packet from SRT), thereby avoiding frame buffer read operations usually performed by BKE.

Polygon Memory Management

For the page of Polygon Memory being written, MEX maintains pointers for the current write locations: one for vertex information V2; and one for state information S3. The VertexPointer is the pointer to the current vertex entry in Polygon Memory. VertexCount is the number of vertices saved in Polygon Memory since the last state change. VertexCount is assigned to the ColorOffset. VertexPointer is assigned to the ColorPointer for the Sort primitives. Previous vertices are used during handling of memory overflow. MIJ uses the ColorPointer, ColorOffset and the vertex size information (encoded in the ColorType received from GEO) to retrieve the MLM Pointers and the primitive vertices from the Polygon Memory.

Alternate Embodiments

In one embodiment, CUL outputs VSPs in primitive order, rather than spatial order. That is, all the VSPs corresponding to a particular primitive are output before VSPs from another primitive. However, if CUL processes data tile-by-tile, then VSPs from the same primitive are still interleaved with VSPs from other primitives. Outputting VSPs in primitive order helps with caching data downstream of MIJ.

In an alternate embodiment, the entire MEX State Vector is treated as a single memory, and state packets received by MEX update random locations in the memory. This requires only a single type of packet to update the MEX State Vector, and that packet includes an address into the memory and the data to place there. In one version of this embodiment, the data is of variable width, with the packet having a size parameter.

In another alternate embodiment, the PHB and/or TEX blocks are microcoded processors, and one or more of the partitions of the MEX State Vector include microcode. For example, in one embodiment, the TexAFront, TexABack, TexBFront, and TexBBack packets contain the microcode. Thus, in this example, a 3D object has its own microcode that describes how its shading is to be done. This provides a mechanism for more complex lighting models as well as user-coded shaders. Hence, in a deferred shader, the microcode is executed only for pixels (or samples) that affect the final picture.

In one embodiment of this invention, pipeline state information is only input to the pipeline when it has changed. Specifically, an application program may use API (Application Program Interface) calls to repeatedly set the pipeline state to substantially the same values, thereby requiring (for minimal Polygon Memory usage) the driver software to determine which state parameters have changed, and then send only the changed parameters into the pipeline. This simplifies the hardware because the simple Dirty Flag mechanism can be used to determine whether to store data into Polygon Memory. Thus, when a software driver performs state change checking, the software driver maintains the state in shadow registers in host memory. When the software driver detects that the new state is the same as the immediately previous state, the software driver does not send any state information to the hardware, and the hardware continues to use the same state information. Conversely, if the software driver detects that there has been a change in state, the new state information is stored into the shadow registers in the host, and new state information is sent to hardware, so that the hardware may operate under the new state information.

In an alternate embodiment, MEX receives incoming pipeline state information and compares it to values in the MEX State Vector. For any incoming values are different than the corresponding values in the MEX State Vector, appropriate Dirty Flags are set. Incoming values that are not different are discarded and do not cause any changes in Dirty Flags. This embodiment requires additional hardware (mostly in the form of comparitors), but reduces the work required of the driver software because the driver does not need to perform comparisons.

In another embodiment of this invention, MEX checks for certain types of state changes, while the software driver checks for certain other types of hardware state changes. The advantage of this hybrid approach is that hardware dedicated to detecting state change can be minimized and used only for those commonly occurring types of state change, thereby providing high speed operation, while still allowing all types of state changes to be detected, since the software driver detects any type of state change not detected by the hardware. In this manner, the dedicated hardware is simplified and high speed operation is achieved for the vast majority of types of state changes, while no state change can go unnoticed, since software checking determines the other types of state changes not detected by the dedicated hardware.

In another alternative embodiment, MEX first determines if the updated state partitions to be stored in Polygon Memory already exist in Polygon Memory from some previous operation and, if so, sets pointers to point to the already existing state partitions stored in Polygon Memory. This method maintains a list of previously saved state, which is searched sequentially (in general, this would be slower), or which is searched in parallel with an associative cache (i.e., a content addressable memory) at the cost of additional hardware. These costs may be offset by the saving of significant amounts of Polygon Memory.

In yet another alternative embodiment, the application program is tasked with the requirement that it attach labels to each state, and causes color vertices to refer to the labeled state. In this embodiment, labeled states are loaded into Polygon Memory either on an as needed basis, or in the form of a pre-fetch operation, where a number of labeled states are loaded into Polygon Memory for future use. This provides a mechanism for state vectors to be used for multiple rendering frames, thereby reducing the amount of data fed into the pipeline.

In one embodiment of this invention, the pipeline state includes not just bits located within bit locations defining particular aspects of state, but pipeline state also includes software (hereinafter, called microcode) that is executed by processors within the pipeline. This is particularly important in the PHB block because it performs the lighting and shading operation; hence, a programmable shader within a 3D graphics pipeline that does deferred shading greatly benefits from this innovation. This benefit is due to eliminating (via the hidden surface removal process, or CUL block) computationally expensive shading of pixels (or pixel fragments) that would be shaded in a conventional 3D renderer. Like all state information, this microcode is sent to the appropriate processing units, where it is executed in order to effect the final picture. Just as state information is saved in Polygon Memory for possible future use, this microcode is also saved as part of state information S3. In one embodiment, the software driver program generates this microcode on the fly (via lining pre-generated pieces of code) based on parameters sent from the application program. In a simpler embodiment, the driver software keeps a pre-compiled version of microcode for all possible choices of parameters, and simply sends appropriate versions of microcode (or pointers thereto) into the pipeline as state information is needed. In another alternative embodiment, the application program supplies the microcode.

As an alternative, more pointers are included in the set of MLM Pointers. This could be done to make smaller partitions of the MEX State Vector, in the hopes of reducing the amount of Polygon Memory required. Or, this is done to provide pointers for partitions for both front-facing and back-facing parameters, thereby avoiding the breaking of meshes when the flip from front-facing to back-facing or visa versa.

Figure 13A:
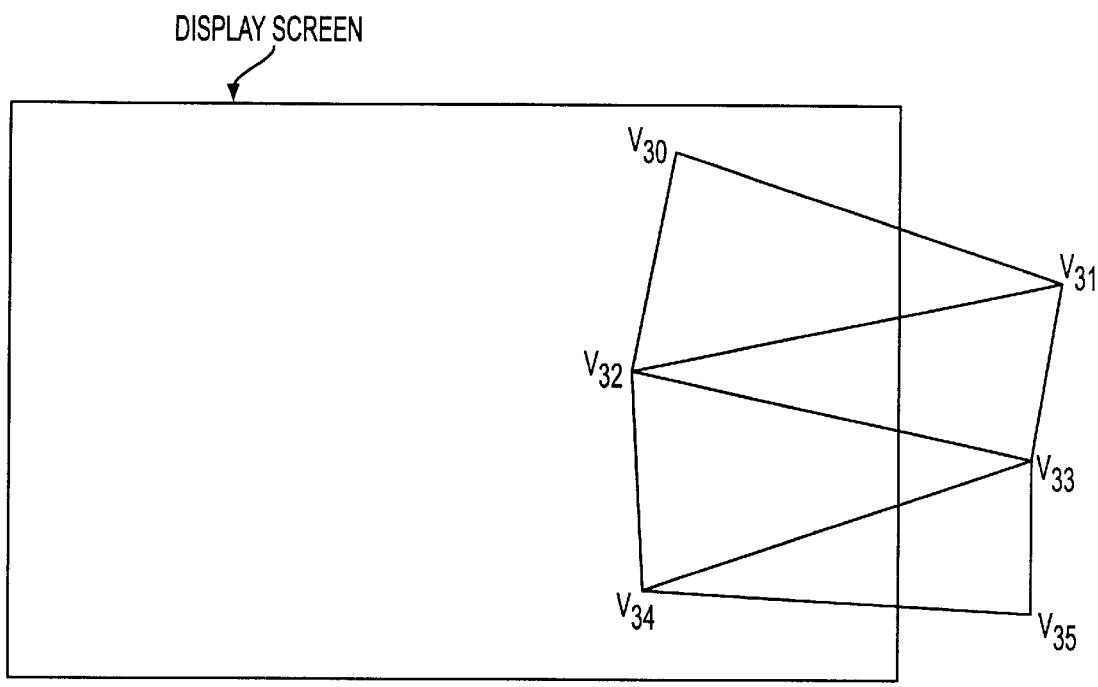
FIG. 13 is a diagrammatic illustration depicting one aspect of the present invention in which clipped triangles are turned in to fans for improved processing.
Figure 13B:
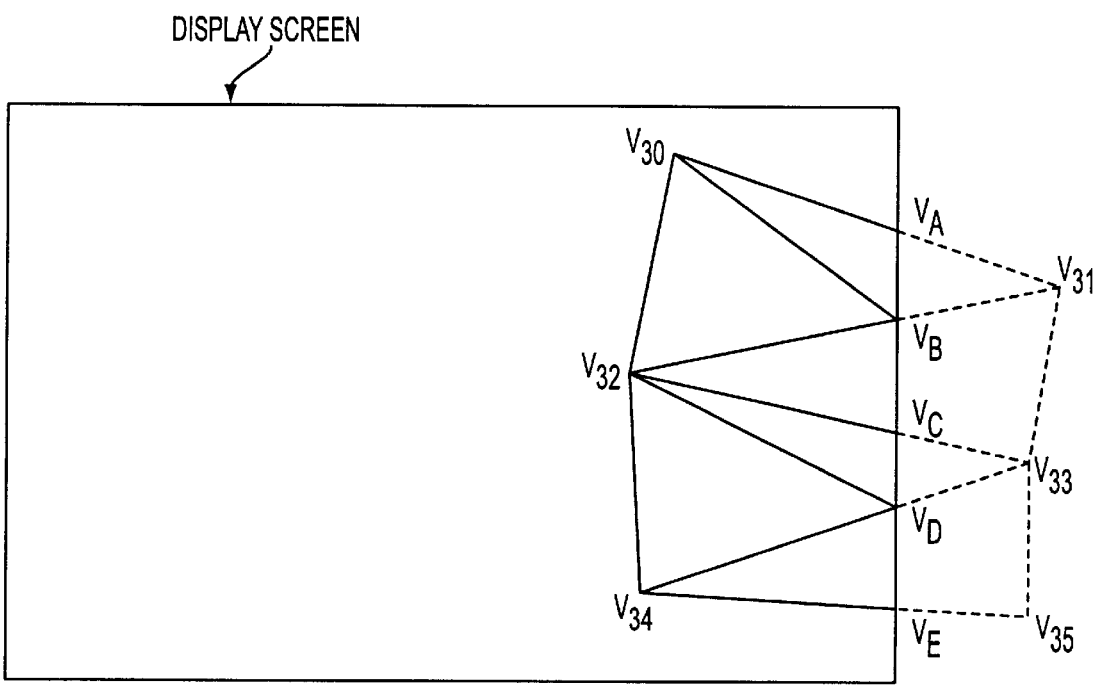

In Sort Memory, vertex locations are either clipped to the window (i.e., display screen) or not clipped. If they are not clipped, high precision numbers (for example, floating point) are stored in Sort Memory. If they are clipped, reduced precision can be used (fixed-point is generally sufficient), but, in prior art renderers, all the vertex attributes (surface normals, texture coordinates, etc.) must also be clipped, which is a computationally expensive operation. As an optional part of the innovation of this invention, clipped vertex locations are stored in Sort Memory, but unclipped attributes are stored in Polygon Memory (along with unclipped vertex locations). FIG. 13A shows a display screen with a triangle strip composed of six vertices; these vertices, along with their attributes, are stored into Polygon Memory. FIG. 13B shown the clipped triangles that are stored into Sort Memory. Note, for example, that triangle $V_{30}$–$V_{31}$–$V_{32}$ is represented by two on-display triangles:

$V_{30}$–$V_{A}$–$V_{B}$ and $V_{30}$–$V_{B}$–$V_{32}$, where $V_A$ and $V_B$ are the vertices created by the clipping process. In one embodiment, Front Facing can be clipped or unclipped attributes, or if the "on display" vertices are correctly ordered "facing" can be computed.

A useful alternative provides two ColorOffset parameters in the Color Pointer, one being used to find the MLM Pointers; the other being used to find the first vertex in the mesh. This makes it possible for consecutive triangle fans to share a single set of MLM Pointers.

For a low-cost alternative, the GEO function of the present invention is performed on the host processor, in which case CFD, or host computer, feeds directly into MEX.

As a high-performance alternative, multiple pipelines are run in parallel. Or, parts of the pipeline that are a bottleneck for a particular type of 3D data base are further paralyzed. For example, in one embodiment, two CUL blocks are used, each working on different contiguous or non-contiguous regions of the screen. As another example, subsequent images can be run on parallel pipelines or portions thereof.

In one embodiment, multiple MEX units are provided so as to have one for each process on the host processor that was doing rendering or each graphics Context. This results on "zero overhead" context switches possible.

Example of MEX Operation

In order to understand the details of what MEX needs to accomplish and how it is done, let us consider an example shown in FIG. 14, FIG. 15, and FIG. 16. These figures show an example sequence of packets (FIG. 14) for an entire frame of data, sent from GEO to MEX, numbered in time-order from 1 through 55, along with the corresponding entries in Sort Memory (FIG. 15) and Polygon Memory (FIG. 16). For simplicity, FIG. 15 does not show the tile pointer lists and mode pointer list that SRT also writes into Sort Memory. Also, in one preferred embodiment, vertex information V2 is written into Polygon Memory starting at the lowest address and moving sequentially to higher addresses (within a page of Polygon Memory); while state information S3 is written into Polygon Memory starting at the highest address and moving sequentially to lower addresses. Polygon Memory is full when these addresses are too low to write additional data.

Referring to the embodiment of FIG. 14, the frame begins with a BeginFrame packet that is a demarcation at the beginning of frames, and supplies parameters that are constant for the entire frame, and can include: source and target window IDs, framebuffer pixel format, window offsets, target buffers, etc. Next, the frame generally includes packets that affect the MEX State Vector, are saved in MEX, and set their corresponding Dirty Flags; in the example shown in the figures, this is packets 2 through 12. Packet 13 is a Clear packet, which is generally supplied by an application program near the beginning of every frame. This Clear packet causes the CullMode data to be written to. Sort Memory (starting at address 0x0000000) and PixMode data to be written to Polygon Memory (other MEX State Vector partitions have their Dirty Flags set, but Clear packets are not affected by other Dirty Bits). Packets 14 and 15 affect the MEX State Vector, but overwrite values that were already labeled as dirty. Therefore, any overwritten data from packets 3 and 5 is not used in the frame and is discarded. This is an example of how the invention tends to minimize the amount of data saved into memories.

Packet 16, a Color packet, contains the vertex information V2 (normals, texture coordinates, etc.), and is held in MEX until vertex information V1 is received by MEX. Depending on the implementation, the equivalent of packet 16 could alternatively be composed of a multiplicity of packets. Packet 17, a Sort packet, contains vertex information V1 for the first vertex in the frame, $V_0$. When MEX receives a Sort Packet, Dirty Flags are examined, and partitions of the MEX State Vector that are needed by the vertex in the Sort Packet are written to Polygon Memory, along with the vertex information V2. In this example, at the moment packet 17 is received, the following partitions have their Dirty Flags set: MatFront, MatBack, TexAFront, TexABack, TexBFront, TexBBack, Light, and Stipple. But, because this vertex is part of a front-facing polygon (determined in GEO), only the following partitions get written to Polygon Memory: MatFront, TexAFront, TexBFront, Light, and Stipple (shown in FIG. 16 as occupying addresses 0xFFFFF00 to 0xFFFFFEF). The Dirty Flags for MatBack, TexABack, and TexBBack remain set, and the corresponding data is not yet written to Polygon Memory. Packets 18 through 23 are Color and Sort Packets, and these complete a triangle strip that has two triangles. For these Sort Packets (packets 19, 21, and 23), the Dirty Flags are examined, but none of the relevant Dirty Flags are set, which means they do not cause writing of any state information S3 into Polygon Memory.

Packets 24 and 25 are MatFront and TexAFront packets. Their data is stored in MEX, and their corresponding Dirty Flags are set. Packet 26 is the Color packet for vertex $V_4$. When MEX receives packet 27, the MatFront and TexAFront Dirty Flags are set, causing data to be written into Polygon Memory at addresses 0xFFFFED0 through 0xFFFFEFF. Packets 28 through 31 describe $V_5$ and $V_6$, thereby completing the triangle $V_4$–$V_5$–$V_6$.

Packet 31 is a color packet that completes the vertex information V2 for the triangle $V_4$–$V_5$–$V_6$, but that triangle is clipped by a clipping plane (e.g. the edge of the display screen). GEO generates the vertices $V_A$ and $V_B$, and these are sent in Sort packets 34 and 35. As far as SRT is concerned, triangle $V_5$–$V_6$–$V_7$ does not exist; that triangle is replaced with a triangle fan composed of $V_5$–$V_A$–$V_B$ and $V_5$–$V_B$–$V_6$. Similarly, packets 37 through 41 complete $V_6$–$V_7$–$V_8$ for Polygon Memory and describe a triangle fan of $V_6$–$V_B$–$V_C$ and $V_6$–$V_C$–$V_8$ for Sort Memory. Note that, for example, the Sort Memory entry for $V_B$ (starting at address 0x00000B0) has a Sort Primitive Type of tri_fan, but the ColorOffset parameter in the Color Pointer is set to tri_strip.

Packets 42 through 46 set values within the MEX State Vector, and packets 47 through 54 describe a triangle fan. However, the triangles in this fan are backfacing (backface culling is assumed to be disabled), so the receipt of packet 48 triggers the writing into Polygon Memory of the MatBack, TexABack, and TexBBack partitions of the MEX State Vector because their Dirty Flags were set (values for these partitions were input earlier in the frame, but no geometry needed them). The Light partition also has its Dirty Flag set, so it is also written to Polygon Memory, and CullMode is written to Sort Memory.

The End Frame packet (packet 55) designates the completion of the frame. Hence, SRT can mark this page of Sort Memory as complete, thereby handing it off to the read process in the SRT block. Note that the information in packets 43 and 44 was not written to Polygon Memory because no geometry needed this information (these packets pertain to front-facing geometry, and only back-facing geometry was input before the End Frame packet).

Memory Multi-Buffering and Overflow

In some rare cases, Polygon Memory can overflow. Polygon memory and/or Sort Memory will overflow if a single user frame contains too much information. The overflow point depends on the size of Polygon Memory; the frequency of state information S3 changes in the frame; the way the state is encapsulated and represented; and the primitive features used (which determines the amount of vertex information V2 is needed per vertex). When memory fills up, all primitives are flushed down the pipe and the user frame finished with another fill of the Polygon Memory buffer (hereinafter called a "frame break"). Note that in an embodiment where SRT and MEX have dedicated memory, Sort Memory overflow triggers the same overflow mechanism. Polygon Memory and Sort Memory buffers must be kept consistent. Any skid in one memory due to overflow in the other must be backed out (or, better yet, avoided). Thus in MEX, a frame break due to overflow may result due to a signal from SRT that a Sort memory overflow occurred or due to memory overflow in MEX itself. A Sort Memory overflow signal in MEX is handled in the same way as an overflow in MEX Polygon Memory itself.

Note that the Polygon Memory overflow can be quite expensive. In one embodiment, the Polygon Memory, like Sort Memory, is double buffered. Thus MEX will be writing to one buffer, while MIJ is reading from the other. This situation causes a delay in processing of frames, since MEX needs to wait for MIJ to be done with the frame before it can move on to the next (third) frame. Note that MEX and SRT are reasonably well synchronized. However, CUL needs (in general) to have processed a tile's worth of data before MIJ can start reading the frame that MEX is done with. Thus, for each frame, there is a possible delay or stall. The situation can become much worse if there is memory overflow. In a typical overflow situation, the first frame is likely to have a lot of data and the second frame very little data. The elapsed time before MEX can start processing the ext frame in the sequence is (time taken by MEX for the full frame+CUL tile latency+MIJ frame processing for the full frame) and not (time taken by MEX for the full frame+time taken by MEX for the overflow frame). Note that the elapsed time is nearly twice the time for a normal frame. In one embodiment, this cost is reduced by minimizing or avoiding overflow by having software get an estimate of the scene size, and break the frame in two or more roughly equally complex frames. In another embodiment, the hardware implements a policy where overflows occur when one or more memories are exhausted.

In an alternative embodiment, Polygon Memory and Sort Memory are each multi-buffered, meaning that there are more than two frames available. In this embodiment, MEX has available additional buffering and thus need not wait for MIJ to be done with its frame before MEX can move on to its next (third) frame.

In various alternative embodiments, with Polygon Memory and Sort Memory multi-buffered, the size of Polygon Memory and Sort Memory is allocated dynamically from a number of relatively small memory pages. This has advantages that, given memory size, containing a number of memory pages, it is easy to allocate memory to plurality of windows being processed in a multi-tasking mode (i.e., multiple processes running on a single host processor or on a set of processors), with the appropriate amount of memory being allocated to each of the tasks. For very simple scenes, for example, significantly less memory may be needed than for complex scenes being rendered in greater detail by another process in a multi-tasking mode.

MEX needs to store the triangle (and its state) that caused the overflow in the next pages of Sort Memory and Polygon Memory. Depending on where we are in the vertex list we may need to send vertices to the next buffer that have already been written to the current buffer. This can be done by reading back the vertices or by retaining a few vertices. Note that quadrilaterals require three previous vertices, lines will need only one previous vertex while points are not paired with other vertices at all. MIJ sends a signal to MEX when MIJ is done with a page of Polygon Memory. Since STP and CUL can start processing the primitives on a tile only after MEX and SRT are done, MIJ may stall waiting for the VSPs to start arriving.

MLM Pointer and Mode Packet Caching

Like the color packets, MIJ also keeps a cache of MLM pointers. Since the address of the MLM pointer in Polygon Memory uniquely identifies the MLM pointer, it is also used as the tag for the cache entries in the MLM pointer cache. The Color Pointer is decoded to obtain the address of the MLM pointer.

MIJ checks to see if the MLM pointer is in the cache. If a cache miss is detected, then the MLM pointer is retrieved from the Polygon Memory. If a hit is detected, then it is read from the cache. The MLM pointer is in turn decoded to obtain the addresses of the six state packets, namely, in this embodiment, light, material, textureA, textureB, pixel mode, and stipple. For each of these, MIJ determines the packets that need to be retrieved from the Polygon Memory. For each state address that has its valid bit set, MIJ examines the corresponding cache tags for the presence of the tag equal to the current address of that state packet. If a hit is detected, then the corresponding cache index is used, if not then the data is retrieved from the Polygon Memory and the cache tags updated. The data is dispatched to FRG or PXL block as appropriate, along with the cache index to be replaced.

Guardband Cliping

Figure 17:
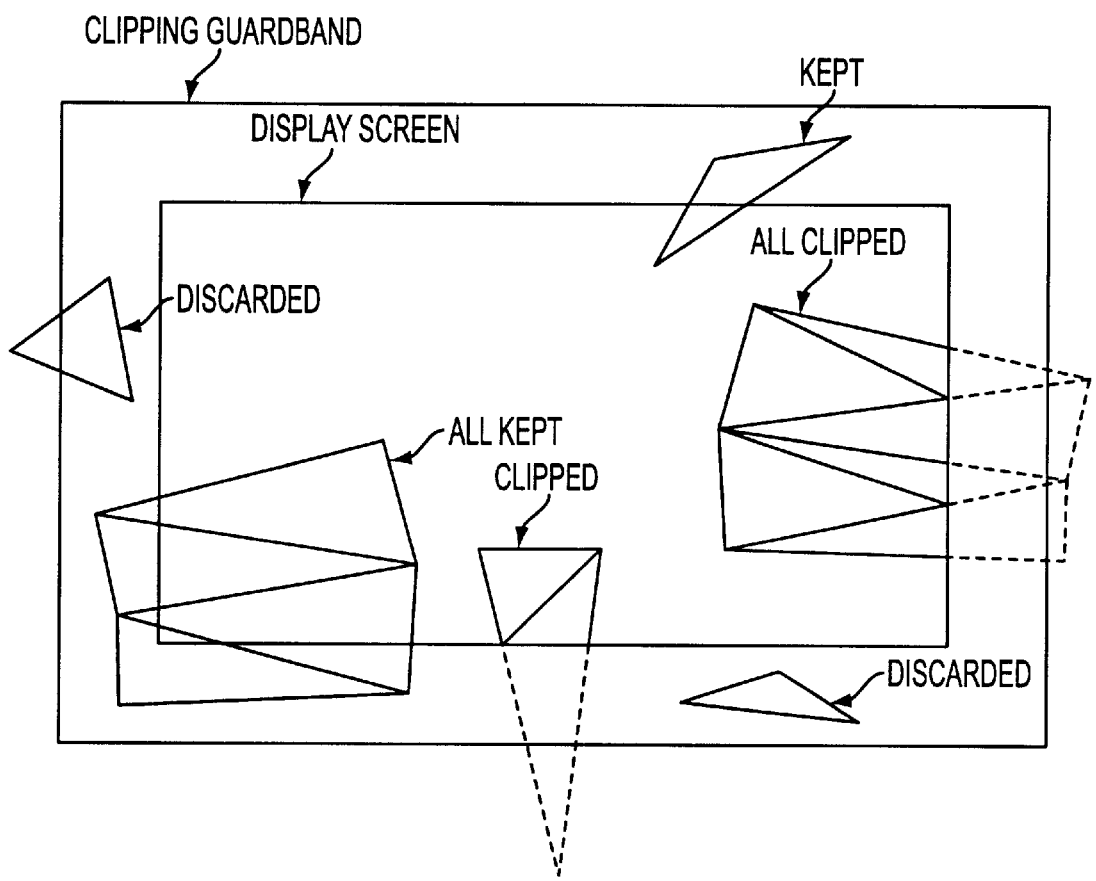
FIG. 17 is a diagrammatic illustration showing examples of a Clipping Guardband around the display screen.

The example of MEX operation, described above, assumed the inclusion of the optional feature of clipping primitives for storing into Sort Memory and not clipping those same primitives's attributes for storage into Polygon Memory. FIG. 17 shows an alternate method that includes a Clipping Guardband surrounding the display screen. In this embodiment, one of the following clipping rules is applied: a) do not clip any primitive that is completely within the bounds of the Clipping Guardband; b) discard any primitive that is completely outside the display screen; and c) clip all other primitives. The clipping in the last rule can be done using either the display screen (the preferred choice) or the Clipping Guardband; FIG. 17 assumes the former. In this embodiment it may also be done in other units, such as the HostCPU. The decision on which rule to apply, as well as the clipping, is done in GEO.

Some Parameter Details

Given the texture id, its (s, t, r, q) coordinates, and the mipmap level, the TEX block is responsible for retrieving the texels, unpacking and filtering the texel data as needed. FRG block sends texture id, s, t, r, L.O.D., level, as well as the texture mode information to TEX. Note that s, t, and r (and possibly the mip level) coming from FRG are floating point values. For each texture, TEX outputs one texel value (e.g., RGB, RGBA, normal perturbation, intensity, etc.) to PHG. TEX does not combine the fragment and texture colors; that happens in the PHB block. TEX needs the texture parameters and the texture coordinates. Texture parameters are obtained from the two texture parameter caches in the TEX block. FRG uses the texture width and height parameters in the L.O.D. computation. FRG may use the TextureDimension field (a parameter in the MEX State Vector) to determine the texture dimension and if it is enabled and TexCoordSet (a parameter in the MEX State Vector) to associate a coordinate set with it.

Similarly, for CullModes, MEX may strip away one of the LineWidth and PointWidth attributes, depending on the primitive type. If the vertex defines a point, then LineWidth is thrown away and if the vertex defines a line, then PointWidth is thrown away. Mex passes down only one of the line or point width to the SRT.

Processor Allocation in PHB Block

As tiles are processed, there are generally a multiplicity of different 3D object visible within any given tile. The PHB block data cache will therefore typically store state information and microcode corresponding to more than one object. But, the PHB is composed of a multiplicity of processing units, so state information from the data cache may be temporarily copied into the processing units as needed. Once state information for a fragment from a particular object is sent to a particular processor, it is desirable that all other fragments from that object also be directed to that processor. PHB keeps track of which object's state information has been cached in which processing unit within the block, and attempts to funnel all fragments belonging that same object to the same processor. Optionally, an exception to this occurs if there is a load imbalance between the processors or engines in the PHB unit, in which case the fragments are allocated to another processor. This object-tag-based resource allocation occurs relative to the fragment processors or fragment engines in the PHG.

Data Cache Management in Downstream Blocks

The MIJ block is responsible for making sure that the FRG, TEX, PHB, and PIX blocks have all the information they need for processing the pixel fragments in a VSP, before the VSP arrives at that stage. In other words, the vertex information V2 of the primitive (i.e., of all its vertices), as well as the six MEX State Vector partitions pointed to by the pointers in the MLM Pointer, need to be resident in their respective blocks, before the VSP fragments can be processed. If MIJ was to retrieve the MLM Pointer, the state packets, and ColorVertices for each of the VSPs, it will amount to nearly 1 KB of data per VSP. For 125M VSPs per second, this would require 125 GB/sec of Polygon Memory bandwidth for reading the data, and as much for sending the data down the pipeline. It is not desirable to retrieve all the data for each VSP, some form of caching is desirable.

It is reasonable to think that there will be some coherence in VSPs and the primitives; i.e. we are likely to get a sequence of VSPs corresponding to the same primitive. We could use this coherence to reduce the amount of data read from Polygon Memory and transferred to Fragment and Pixel blocks. If the current VSP originates from the same primitive as the preceding VSP, we do not need to do any data retrieval. As pointed out earlier, the VSPs do not arrive at MIJ in primitive order. Instead, they are in the VSP scan order on the tile, i.e. the VSPs for different primitives crossing the scan-line may be interleaved. Because of this reason, the caching scheme based on the current and previous VSP alone will cut down the bandwidth by approximately 80% only.

In accordance with this invention, a method and structure is taught that takes advantage of primitive coherence on the entire region, such as a tile or quad-tile. (A 50 pixel triangle on average will touch 3 tiles, if the tile size is 16×16. For a 32×32 tile, the same triangle will touch 1.7 tiles. Therefore, considering primitive coherence on the region will significantly reduce the bandwidth requirement.) This is accomplished by keeping caches for MLM Pointers, each of state partitions, and the color primitives in MIJ. The size of each of the caches is chosen by their frequency of incidence on the tile. Note that while this scheme can solve the problem for retrieving the data from the Polygon Memory, we still need to deal with data transfer from MIJ to FRG and PXL blocks every time the data changes. We resolve this in the following way.

Decoupling of Cached Data and Tags

Figure 18:
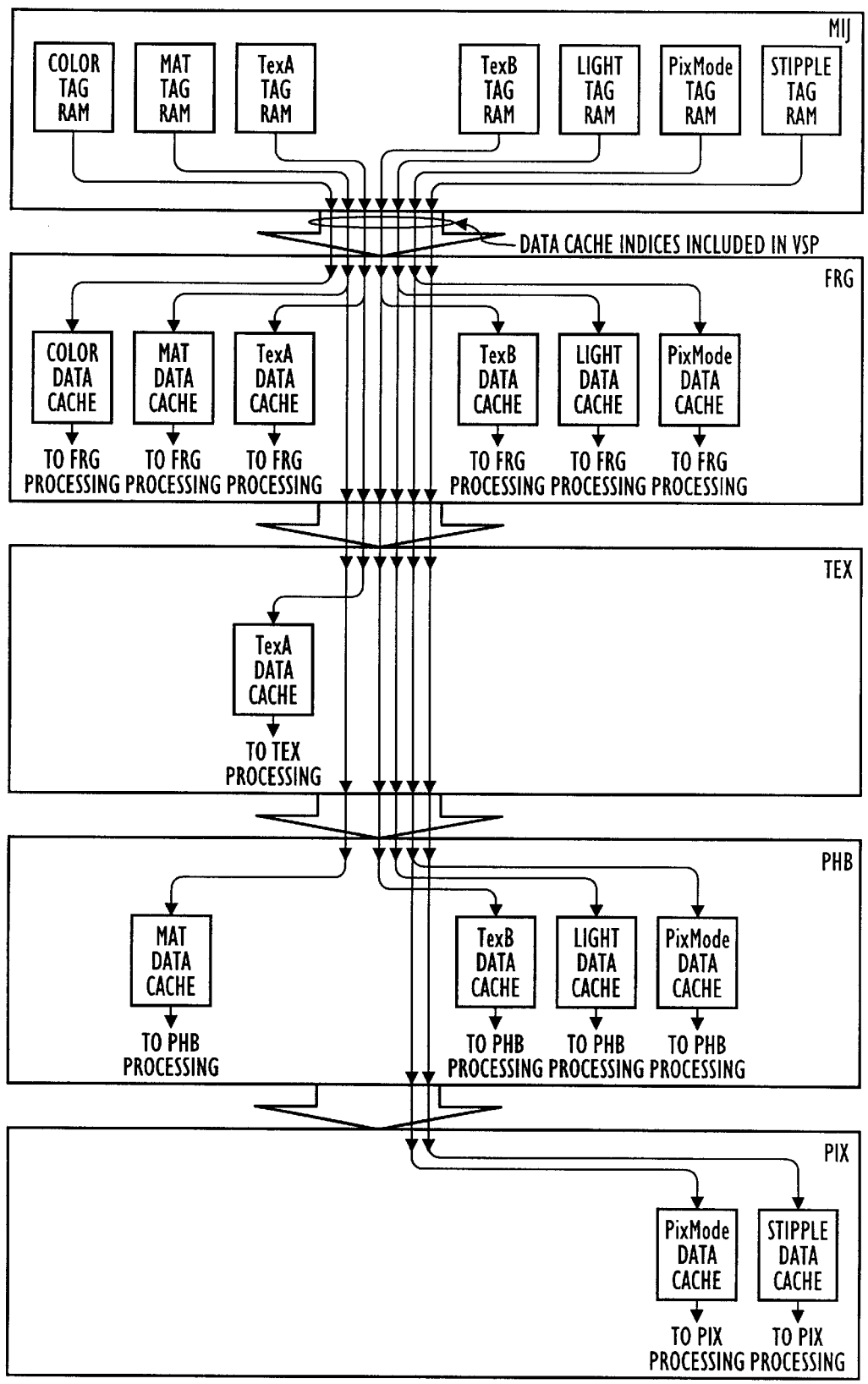
FIG. 18 is a flow chart depicting an operation of one embodiment of the Caching Technique of this invention.
Figure 19:
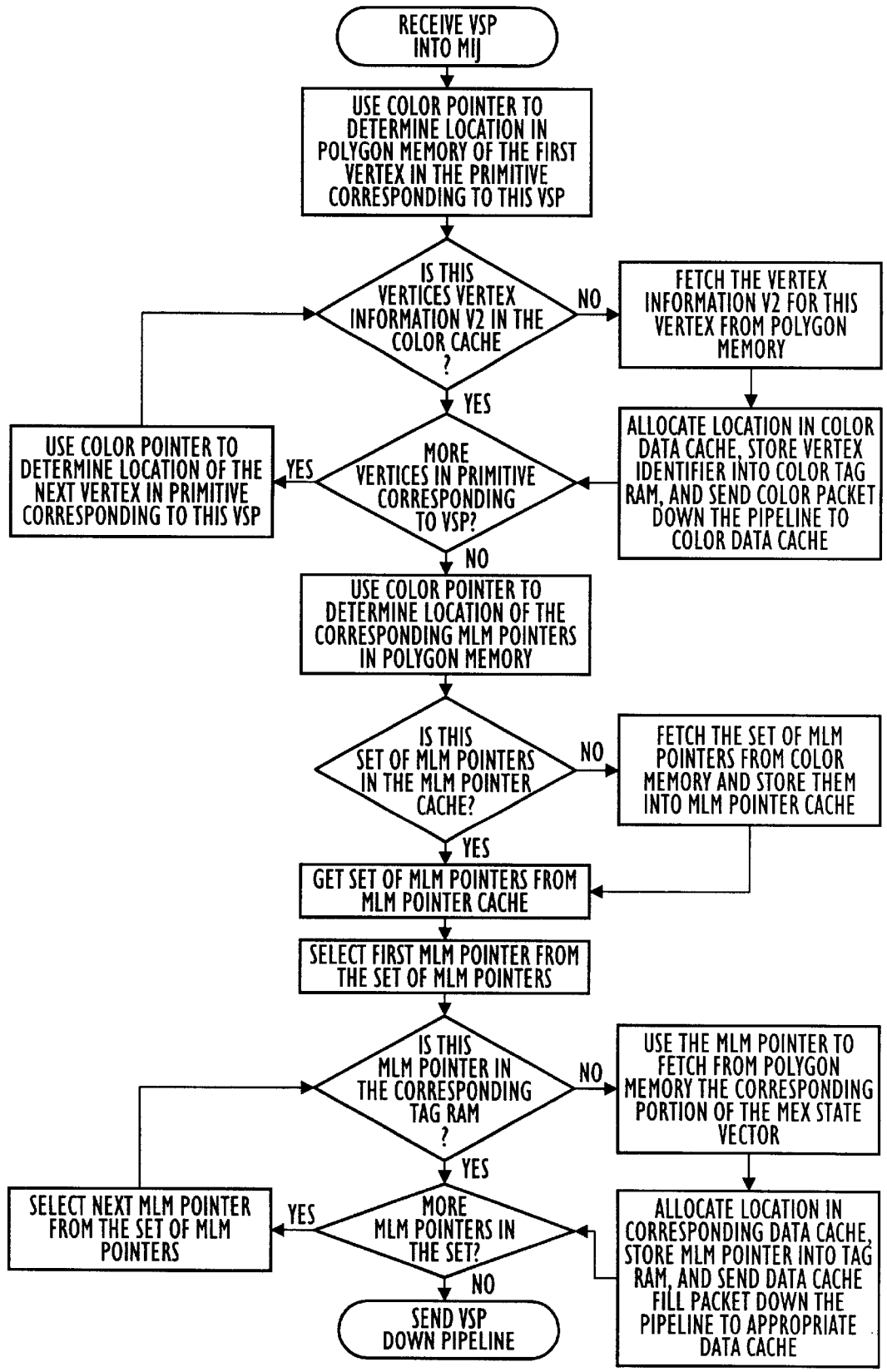
FIG. 19 is a diagrammatic illustration showing the manner in which mode data flows and is cached in portions of the DSGP pipeline.

The data retrieved by MIJ is consumed by other blocks. Therefore, we store the cache data within those blocks. As depicted in FIG. 18, each of the FRG, TEX, PHB, and PIX blocks have a set of caches, each having a size determined independently from the others based upon the expected number of different entries to avoid capacity misses within one tile (or, if the caches can be made larger, to avoid capacity misses within a set tiles, for example a set of four tiles). These caches hold the actual data that goes in their cache-line entries. Since MIJ is responsible for retrieving the relevant data for each of the units from Polygon Memory and sending it down to the units, it needs to know the current state of each of the caches in the four aforementioned units. This is accomplished by keeping the tags for each of the caches in MIJ and having MIJ to do all the cache management. Thus data resides in the block that needs it and the tags reside in MIJ for each of the caches. With MIJ aware of the state of each of the processing units, when MIJ receives a packet to be sent to one of those units, MIJ determines whether the processing unit has the necessary state to process the new packet. If not, MIJ first sends to that processing unit packets containing the necessary state information, followed by the packet to be processed. In this way, there is never a cache miss within any processing unit at the time it receives a data packet to be to be processed. A flow chart of this mode injection operation is shown in FIG. 19.

MIJ manages multiple data caches—one for FRG (ColorCache) and two each for the TEX (TexA, TexB), PHG (Light, Material, Shading), and PIX (PixMode and Stipple) blocks. For each of these caches the tags are cached in MIJ and the data is cached in the corresponding block. MIJ also maintains the index of the data entry along with the tag. In addition to these seven caches, MIJ also maintains two caches internally for efficiency, one is the Color dualoct cache and the other is the MLM Pointer cache; for these, both the tag and data reside in MIJ. In this embodiment, each of these nine tag caches are fully associative and use CAMs for cache tag lookup, allowing a lookup in a single clock cycle.

In one embodiment, these caches are listed in the table below.

| Cache | Block | # entries |
|---|---|---|
| Color dualoct | MIJ | 32 |
| Mlm_ptr | MIJ | 32 |
| ColorData | FRG | 128 |
| TextureA | TEX | 32 |
| TextureB | TEX | 16 |
| Material | PHG | 32 |
| Light | PHG | 8 |
| PixelMode | PIX | 16 |
| Stipple | PIX | 4 |

In one embodiment, cache replacement policy is based on the First In First Out (FIFO) logic for all caches in MIJ.

Color Caching in FRG

"Color" caching is used to cache color packet. Depending on the extent of the processing features enabled, a color packet may be 2, 4, 5, or 9 dualocts long in the Polygon Memory. Furthermore, a primitive may require one, two or three color vertices depending on if it is a point, a line, or a filled triangle, respectively. Unlike other caches, color caching needs to deal with the problem of variable data sizes in addition to the usual problems of cache lookup and replacement. The color cache holds data for the primitive and not individual vertices.

In one embodiment, the color cache in FRG block can hold 128 full performance color primitives. The TagRam in MIJ has a 1-to-1 correspondence with the Color data cache in the FRG block. A ColorAddress uniquely identifies a Color primitive. In one embodiment the 24 bit Color Address is used as the tag for the color cache.

The color caching is implemented as a two step process. On encountering a VSP, MIJ first checks to see if the color primitive is in the color cache. If a cache hit is detected, then the color cache index (CCIX) is the index of the corresponding cache entry. If a color cache miss is detected, then MIJ uses the color address and color type to determine the dualocts to be retrieved for the color primitives. We expect a substantial number of "color" primitives to be a part of the strip or fans. There is an opportunity to exploit the coherence in colorVertex retrieval patterns here. This is done via "Color Dualoct" caching. MIJ keeps a cache of 32 most recently retrieved dualocts from the color vertex data. For each dualoct, MIJ keeps a cache of 32 most recently retrieved dualocts from the color vertex data. For each dualoct, MIJ checks the color dualoct cache in the MIJ block to see if the data already exists. RDRAM fetch requests are generated for the missing dualocts. Each retrieved dualoct updates the dualoct cache.

Once all the data (dualocts) corresponding to the color primitive have been obtained, MIJ generates the color cache index (CCIX) using the FIFO or other load balancing algorithm. The color primitive data is packaged and sent to the Fragment block and the CCIX is incorporated in the VSP going out to the Fragment block.

MIJ sends three kinds of color cache fill packets to the FRG block. The Color Cache Fill 0 packets correspond to the primitives rendered at full performance and require one cache line in the color cache. The Color Cache Fill 1 packets correspond to the primitives rendered in half performance mode and fill two cache lines in the color cache. The third type of the color cache fill packets correspond to various other performance modes and occupy 4 cache lines in the fragment block color cache. Assigning four entries to all other performance modes makes cache maintenance a lot simpler than if we were to use three color cache entries for the one third rate primitives.

While the present invention has been described with reference to a few specific embodiments, the description is illustrative of the invention and is not to be construed as liming the invention. Various modifications may occur to those skilled in the art without departing from the true spirit and scope of the invention as defined by the appended claims.

What is claimed is:

1. A 3D graphics pipeline for generating a rendered image from a plurality of graphics primitives, the pipeline comprising:

first logic maintaining current pipeline state information, the current pipeline state information divided into a plurality of state partitions;

second logic indicating one or more changed state partitions, the changed state partitions being one or more of the state partitions in which the stored pipeline state information has changed;

a first memory storage storing a multiplicity of the changed state partitions;

third logic generating associations between the graphics primitives and corresponding stored state partitions;

fourth logic determining when one or more of the stored changed state partitions is needed by one or more other units in the graphics pipeline; and fifth logic retrieving one or more of the stored changed state partitions from the first memory partition by using the generated associations.

2. The 3D graphics pipeline of claim 1, further comprising:

a second memory storage storing spatial data of the primitives;

a third memory storage storing non-spatial data of the primitives; and a sixth logic generating associations between the spatial data of the primitives and the non-spatial data of the primitives.

3. The 3D graphics pipeline of claim 2, further comprising:

a seventh logic spatially sorting the primitives according to a set of tiles within the image, the tiles being regions within the image, the seventh logic generating a list for each of the tiles of the stored primitives that overlap the tiles.

4. The 3D graphics pipeline of claim 2, further comprising:

a polygon memory comprising the first memory storage and the third memory storage; and a sort memory comprising the second memory storage.

5. The 3D graphics pipeline of claim 4, further comprising:

the polygon memory being multiply buffered; and the sort memory being multiply buffered.

6. The 3D graphics pipeline of claim 2, further comprising:

a single physical memory array comprising: the first memory storage; the second memory storage; and the third memory storage.

7. The 3D graphics pipeline of claim 2, wherein the sixth logic further comprises:

logic generating a set of pointers for each primitive, each of the sets of pointers used for locating the non-spatial data of the primitives, the set of pointers comprising an address and an offset.

8. The 3D graphics pipeline of claim 1, wherein the first logic further comprises:

a fourth memory storage storing the current pipeline state information; and logic receiving a data packet of variable width, the packet comprising data to be written into the fourth memory storage and an address into the fourth memory storage.

9. The 3D graphics pipeline of claim 1, further comprising:

the first logic further comprising logic maintaining at least some of the plurality of state partitions in front-back pairs in which only one partition in each pair is relevant for a particular one of the primitives; and the third logic further comprising logic generating associations between each of the graphics primitives and precisely one of the two state partitions in each of the front-back pairs of state partitions.

10. The 3D graphics pipeline of claim 1, further comprising:

an eighth logic receiving labels attached to corresponding state partitions, the labels used to refer to a plurality of labeled state partitions, thereby reducing the amount of data fed into the pipeline.

11. The 3D graphics pipeline of claim 1, wherein the current pipeline state information further comprises software instructions that are executed by processors within the 3D graphics pipeline.

12. The 3D graphics pipeline of claim 1, wherein the second logic further comprises:

a plurality of dirty flags, each of the dirty flags corresponding to one of the state partitions, each dirty flag indicating whether the corresponding state partition has changed since the last time the corresponding state partition was stored.

13. The 3D graphics pipeline of claim 1, wherein the second logic further comprises:

comparators comparing at least some of an incoming pipeline state information to at least some of the current pipeline state information.

14. The 3D graphics pipeline of claim 1, wherein the third logic further comprises:

logic generating a set of pointers, each of the pointers used for locating one of the state partitions in the first memory storage, and the set of pointers being shared amongst a plurality of the primitives.

15. The 3D graphics pipeline of claim 1, further comprising:

a plurality of data cache memories storing pieces of the pipeline state information in the retrieved state partitions so that the number of times state partitions are retrieved from the first memory storage is reduced as compared to a pipeline not storing pieces of the pipeline state information in the retrieved state partitions.

16. The 3D graphics pipeline of claim 15, wherein the fourth logic further comprises:

a plurality of tag memories storing a unique identifier for each of the pieces of pipeline state information that are cached in one of the data cache memories; and logic inputting the unique identifiers into one or more of the tag memories to determine which pieces of the pipeline state information are missing from the data caches.

17. The 3D graphics pipeline of claim 16, wherein the fifth logic further comprises:

logic retrieving the missing pipeline state information and sending the retrieved pipeline state information down the pipeline ahead of associated graphics primitives for storage into the data caches, thereby guaranteeing the retrieved pipeline state information is residing in the data caches at the time it is needed.

18. The 3D graphics pipeline of claim 1, further comprising:

ninth logic performing hidden surface removal to cull out parts of the primitives that definitely do not contribute to the final rendered image.

19. The 3D graphics pipeline of claim 1, wherein a plurality of the first logic, second logic, and third logic are organized into a plurality mode extraction units supporting a plurality of graphics rendering contexts, each of the rendering contexts generating a different rendered image, thereby providing a low cost for switching between contexts.

20. A computing system for 3-D graphics rendering, generating a final rendered image, the system comprising:

a general-purpose computer having a host processor;

host memory coupled to the general purpose computer; and a 3-D graphics processor, the 3-D graphics processor comprising:

first logic maintaining current pipeline state information, the current pipeline state information divided into a plurality of state partitions;

second logic indicating one or more changed state partitions, the changed state partitions being one or more of the state partitions in which the stored pipeline state information has changed;

a first memory storage storing a multiplicity of the changed state partitions;

third logic generating associations between the graphics primitives and corresponding stored state partitions;

fourth logic determining when one or more of the stored changed state partitions is needed by one or more other units in the graphics processor; and fifth logic retrieving one or more of the stored changed state partitions from the first memory partition by using the generated associations.

21. The system of claim 20, the 3D graphics processor further comprising:

a second memory storage storing spatial data of the primitives;

a third memory storage storing non-spatial data of the primitives; and a sixth logic generating associations between the spatial data of the primitives and the non-spatial data of the primitives.

22. A computer program for use in conjunction with a computer system, the computer program comprising a computer program mechanism embedded therein, the computer program mechanism, comprising:

a program module that directs the rendering of a digital representation of a graphics image from a plurality of graphics primitives, to function in a specified manner, storing the final graphics image into a frame buffer memory, the program module including instructions for:

maintaining current pipeline state information, the current pipeline state information divided into a plurality of state partitions;

indicating one or more changed state partitions, the changed state partitions being one or more of the state partitions in which the current pipeline state information has changed;

storing a multiplicity of the changed state partitions;

generating associations between the graphics primitives and corresponding stored state partitions;

determining when one or more of the stored changed state partitions is needed to process one of the graphics primitives; and retrieving one or more of the stored changed state partitions by using the generated associations.

* * * * *